(12) United States Patent
Slater, Jr.

(10) Patent No.: US 8,621,652 B2
(45) Date of Patent: Dec. 31, 2013

(54) COPYING A WEB ELEMENT WITH REASSIGNED PERMISSIONS

(75) Inventor: Lynn Randolph Slater, Jr., Fremont, CA (US)

(73) Assignee: Metabyte Inc., Fremont, CA (US)

( * ) Notice: Subject to any disclaimer, the term of this patent is extended or adjusted under 35 U.S.C. 154(b) by 885 days.

(21) Appl. No.: 12/212,649

(22) Filed: Sep. 18, 2008

(65) Prior Publication Data

US 2010/0071075 A1    Mar. 18, 2010

Related U.S. Application Data

(63) Continuation of application No. PCT/US2008/076570, filed on Sep. 17, 2008.

(60) Provisional application No. 60/994,122, filed on Sep. 17, 2007.

(51) Int. Cl.
*H04L 29/06* (2006.01)

(52) U.S. Cl.
USPC ............................................................ 726/28

(58) Field of Classification Search
USPC .................. 726/2, 27, 28; 713/165, 166, 167
See application file for complete search history.

(56) References Cited

U.S. PATENT DOCUMENTS

| | | | |
|---|---|---|---|
| 6,122,741 A * | 9/2000 | Patterson et al. | 726/17 |
| 6,873,957 B1 | 3/2005 | Chen et al. | |
| 7,000,184 B2 * | 2/2006 | Matveyenko et al. | 715/235 |
| 7,062,532 B1 | 6/2006 | Sweat et al. | |
| 7,280,529 B1 * | 10/2007 | Black et al. | 370/352 |
| 7,627,652 B1 * | 12/2009 | Commons et al. | 709/219 |
| 7,900,262 B2 * | 3/2011 | Ozawa | 726/26 |
| 2005/0149549 A1 * | 7/2005 | Jaspers et al. | 707/102 |
| 2008/0046442 A1 * | 2/2008 | Grason et al. | 707/100 |
| 2008/0071929 A1 * | 3/2008 | Motte et al. | 709/246 |
| 2008/0178122 A1 * | 7/2008 | Besecker | 715/854 |
| 2008/0189617 A1 * | 8/2008 | Covell et al. | 715/738 |
| 2010/0174974 A1 * | 7/2010 | Brisebois et al. | 715/223 |
| 2011/0179177 A1 * | 7/2011 | Alcorn et al. | 709/226 |
| 2011/0202628 A1 * | 8/2011 | Malmer et al. | 709/217 |

\* cited by examiner

*Primary Examiner* — Ali Abyaneh

(74) *Attorney, Agent, or Firm* — Ash Tankha; Lipton, Weinberger & Husick

(57) ABSTRACT

Disclosed herein is a computer implemented method and system for copying a web element with reassigned permissions. An element creator creates the web element in a first location in an online environment. The element creator assigns the permissions to one or more of multiple template users for the web element. The element creator defines a copy operation for the web element for a copying user. The definition comprises selecting one or more of the template users for the reassignment of the permissions. The copying user copies the web element to a second location in the online environment by performing the defined copy operation. The permissions of the selected template users are reassigned to the copying user for the copied web element.

8 Claims, 29 Drawing Sheets

```
Web Page: name=Classroom_X id=117
     Permissions:
          View: Anybody
          Edit Structure: Template_Teacher, Teaching_Supervisors_Group
     Block: name="Welcome to the Classroom" id=2034
          Permissions:
               View: Anybody
               Edit Content: Template_Teacher, Teaching_Supervisors_Group
     Block Reference: name="School Announcements" id=1234
          Permissions:
               View: Anybody
               Edit Content: Office_Staff_Group
     Block: name="Calendar of assignments" id=2045
          Permissions:
               View: Anybody
               Edit Content: Template_Teacher, Substitute_Teachers_Group,
                         Teaching_Supervisors_Group
     Web Page: name='Celebrations' id=119
     Block: name="Our Celebrations" id=2078
          Permissions:
               View: Anybody
               Edit Content: Template_Teacher, Teaching_Supervisors_Group
```

FIG. 6A

```
Copy Content Block
     Name of link: "Add a Classroom"
     Content to Copy: Classroom_X
     Parent Page of Copied Content: List_of_Classrooms
     Name of Copied Content: [ask the user when they click the link]
     User whose permissions get reassigned: Template_Teacher
     Permissions:
          Can click the copy content link: Teaching_Staff_Group
```

FIG. 6B

```
Web Page: name= "Miss Melinar's Classroom" id=188
      Permissions:
            View: Anybody
            Edit Structure: Miss_Melinar,
Teaching_Supervisors_Group
      Block: name="Welcome to the Classroom" id=3011
            Permissions:
                  View: Anybody
                  Edit Content: Miss_Melinar, Teaching_Supervisors_Group
      Block Reference: name="School Announcements" id=1234
            Permissions:
                  View: Anybody
                  Edit Content: Office_Staff_Group
      Block: name="Calendar of assignments" id=3012
            Permissions:
                  View: Anybody
                  Edit Content: Miss_Melinar, Substitute_Teachers_Group,
                            Teaching_Supervisors_Group
   Web Page: name='Celebrations' id=189
    Block: name="Our Celebrations" id=3013
            Permissions:
                  View: Anybody
                  Edit Content: Miss_Melinar, Teaching_Supervisors_Group
```

FIG. 6C

SIGN UP FOR AN ACCOUNT

Email address: lslater2@hotdoodle.com
Password:
Confirm:
First Name: Joe
Last Name: Blow
Username: joeblow
          eg. Bob123, is optional Save

O'Reilly and Goldstein, CPAs.

Home
Services
Calendar
Newsletter
Tools and Links
Contact Us
Clients

555 Any street
Oakland, CA 94607
(510) 555-1212

Welcome, Joe Blow
My Info | Logout

O'Reilly and Goldstein, CPAs allows each of our clients to have private pages within our websites. On these pages we may exchange files and notes.

Create Your Client Page

You can have separate intranet sites for each client, as well as an intranet site for your office or staff. These can include forums for you to send and receive messages and files with your clients (sensitive data should not be transmitted this way for security reasons.

| List of Clients | Add a Client | |
|---|---|---|
| | Email: | Email |
| Joe Blow | Password: | ******** |
| John Doe | Confirm: | ******** |
| | First | First Name |
| | Last | Last Name |
| | Username: | Username |
| | Add a Client | |

Note: You can make the username be a business name, e.g. Niles Cafe

FIG. 11

| Preview | Edit | Blocks | Page | Site | View Outline | Headers | | Help | Home |

HotDoodle™

O'Reilly and Goldstein, CPAs — Welcome Lyn

Home
Services
Calendar
Newsletter
Tools and Links
Contact Us
Clients
 _Templates
[Storeroom]

555 Any Street
Oakland, CA 94607
(510) 555- 1212

Welcome, Lynn Slater

[ Edit ] [ Text Block ]

O'Reilly and Goldstein, CPAs allows each of our clients to have private pages within our website. On these pages we may exchange files and notes

Config. Copy Button Block

Create Your Client Page

[ Edit ] [ Text Block ]

You can have separate intranet sites for each client as well as an intranet site for your office and staff. These can include forums for you to send and receive messages and files with your clients (sensitive data should not be transmitted this way for security

FIG. 13

Articles (Interview_Table) cid= 1491 src=48c5b3e0b22f0 orig=1 is_copy=0

[Config] [Articles Block]

About You

[Add Article]

Age [         ]
Edit [/] [X] [↑] [↓]

Profession [              ]
Edit [/] [X] [↑] [↓]

Your Accounting needs [              ]

Edit [/] [X] [↑] [✗]

[Submit]

Bulletin Boards cid= 1492 src=48c5b4564a952 orig=1 is_copy=0

Config    Bulletin Boards Block

Discussion Area

General        You are Not subscribed Manage Subscriptions...
[Add topic]        No Topics were found

FIG. 15B

Articles (Interview_Table) cid= 1513 src=48c5bbacea81c orig=1 is_copy=0

| Config | Articles Block |

About You

[Add Articles]

Age  [_____]  Edit  [/] [X] [↑] [↓]

Profession  [_____]  Edit  [/] [X] [↑] [↓]

Your Accounting needs  [_____]

Edit  [/] [X] [↑] [✗]

[Submit]

Bulletin Boards cid= 1514 src=48c5bbad08850 orig=1 is_copy=0

Config   Bulletin Boards Block

Discussion Area

General    You are Not subscribed Manage Subscriptions...
[Add topic]    No Topics were found

_Client_Simple

ASSIGN USER ACCESS PERMISSIONS

| User | Administrate | Configure | Manage Articles | Edit Articles | View Articles |
|---|---|---|---|---|---|
| _Client (_Client) | ☐ | ☐ | ☐ | ☑ | ☑ |
| Your Name (Site Owner) | ☐ | ☐ | ☑ | ☑ | ☑ |
| CPA One (cpa1) | ☐ | ☐ | ☑ | ☑ | ☑ |
| Joe Blow (joeblow) | ☐ | ☐ | ☐ | ☐ | ☐ |
| John Doe (johndoe)1 | ☐ | ☐ | ☐ | ☐ | ☐ |

Joe Blow

ASSIGN USER ACCESS PERMISSIONS

| User | Administrate | Configure | Manage Articles | Edit Articles | View Articles |
|---|---|---|---|---|---|
| _Client (_Client) | ☐ | ☐ | ☐ | ☐ | ☐ |
| Your Name (Site Owner) | ☐ | ☐ | ☑ | ☑ | ☑ |
| CPA One (cpa1) | ☐ | ☐ | ☑ | ☑ | ☑ |
| Joe Blow (joeblow) | ☐ | ☐ | ☐ | ☑ | ☑ |
| John Doe (johndoe)1 | ☐ | ☐ | ☐ | ☐ | ☐ |

[ Save Permissions ]  [ Close ]

| Edit | Blocks | Page | Site | View Outline | Headers | | Help | Home |

HotDoodle

O'Reilly and Goldstein, CPAs — Welcome Lyn Slater

Home
Services
Calendar
Newsletter
Tools and Links
Contact Us
Clients
 _Templates
[Storeroom]

555 Any Street
Oakland, CA 94607
(510) 555- 1212

Welcome, Lynn Slater

[Config] [Articles Block]
 [Edit] [Article List]

[Config]
[Edit]  [Container Block]
        [General Block]

This template has been optimized for a financial professional's web site, although it is suitable for many purposes. This template has a powerful intranet framework already built into it so your clients and staff can have private pages, but you can add or change things if you wish. HotDoodle sites are made up of blocks that contain specific content such as text, picture galleries, bulletin boards, and calendars. This particular block contains sample text that you can easily replace with your own.

This template has been stripped of most content to make it easier for your own needs. See an example site built from this template.

| Config | Login Block | Config | Container Block |

Welcome, Lynn Slater
My Info   Logout

[Edit] [Text Block]

Welcome Client
Welcome back. You can see...

[Edit] [Text Block]

Client/Employee Instructions

FIG. 21

|  | New Window | Back | Return to main page |

CONFIGURE PROPERTIES: LOGIN BLOCK

Title (Optional) | Create your client page
View | Style | Access and Permissions | Mirrors

Login Block Functionality:
What to Include — Login on Top, Registration on Bottom
Formatting — Vertical- multiple lines are used to keep each part

For Logins:
Login button label — Login
Subtitle — Returning members — Used if registration is also shown
Shows "Remember me" checkbox? ☑

Upon Login (Or Registration):
Goto Section — <New section>
OR Goto URL
Goto First Owned
Title when logged in
Shows Welcome? ☑
Shows Drop/Join Group?

For New Registrations:
Registration Style — Link
Registration button/link label — Client Registration
Subtitle — Client Registration — Used if login is also shown
Add to this group — Registered Users Custom Hierarchy Cloning Upon Registration:
Copy this section — ..._Clients
Under this section — Clients
Rename to — First_name Last_name
Copy rights of — Client
Copy groups and subs?
Show even when logged in? ☐ (Advanced feature)

FIG. 22

CONFIGURE PROPERTIES: LOGIN BLOCK

Title (Optional): Create your client page

View | Style | Access and Permissions | Mirrors

Login Block Functionality:
What to Include: Login on Top, Registration on Bottom
Formatting: Vertical- multiple lines are used to keep each part

For Logins:
Login button label: Login
Subtitle: Returning members — Used if registration is also shown
Shows "Remember me" checkbox? ☑

Upon Login (Or Registration):
Goto Section: <New section>
OR Goto URL:
Goto First Owned: ☐
Title when logged in:
Shows Welcome? ☑
Shows Drop/Join Group? ☐

For New Registrations:
Registration Style: Link
Registration button/link label: Client Registration
Subtitle: Client Registration — Used if login is also shown
Add to this group: Registered Users Custom Hierarchy Cloning Upon Registration:
Copy this section: ...._Clients
Under this section: Clients
Rename to: First_name Last_name
Copy rights of: Client
Copy groups and subs? ☑ ☒
 If clicked, the group memberships and subscriptions of the "Copy" user are also copied

FIG. 23 ial application No. PCT/US2008/076570 title "Copying A
COPYING A WEB ELEMENT WITH REASSIGNED PERMISSIONS

CROSS REFERENCE TO RELATED APPLICATIONS

This application is a continuation application of International application No. PCT/US2008/076570 title "Copying A Web Element With Reassigned Permissions", with an international filing date of Sep. 17, 2008, now expired, which claims the benefit of provisional patent application No. U.S. 60/994,122 titled "Copying Structures With Reassigned Permissions In Websites", filed on Sep. 17, 2007 in the United States Patent and Trademark Office.

BACKGROUND

This invention, in general, relates to web technology. More particularly, this invention relates to copying a web element with reassigned permissions.

Typically, multiple contributor websites allow multiple users to create and modify content on the website. The multiple contributor websites may assign different levels of permissions to different users. Some users may want to allow other users to copy their created content. The copying may be difficult since it involves obtaining permission from the creator of the content and requires the creator to share code for the content available to the copying user. Transferring the different permissions for the copied content to the copying users is a manual process and may be tedious. Furthermore, the creator may only be allowed to assign the creator's permissions to the copying user.

The creator of content on a website may not anticipate different applications the website may have in the future. The creator may therefore be unable to create web pages, structures, and blocks specific to different applications of the website. The web pages, structures, and blocks are typically hardcoded in the website. The hardcoded web pages, structures, and blocks may not be modifiable by a copying user for use in an application not anticipated by the creator. Hence, the content created on the website typically does not evolve for accommodation of new applications.

Hence, there is a need for copying a web element with reassigned permissions, wherein the permissions of a selected template user are reassigned automatically to the copying user copying the content, and the copied web element evolves to accommodate new applications.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above mentioned need for copying a web element with reassigned permissions. As used herein, the term "element creator" is defined as a user who creates the web element, the term "copying user" is defined as a user who copies the created web element and the term "template user" is defined a standardized model of a user with a unique set of permissions and properties. An element creator creates the web element in a first location in an online environment. The web element may, for example, be a web page or an online data structure. The web element may comprise multiple sub elements. For example, the sub elements may be sub pages of a web page. The web element and the sub elements may comprise multiple content blocks. The content blocks may be, for example, a registration content block, a copy content block, etc.

The element creator assigns the permissions to one or more of multiple template users for the web element. The permissions may also be assigned to one or more template users for a pre-existing web element on a host website in the online environment. The element creator defines a copy operation for the web element for a copying user. The definition of the copy operation comprises selection of one or more of the template users for the reassignment of the permissions. The definition of the copy operation may further comprise definition of properties, for example, content to copy, name of copied content, etc. of the copy operation.

The copying user copies the web element to the second location in the online environment by performing the defined copy operation. The copy operation may copy the entire web element, multiple sub elements, or multiple content blocks from the web elements and the sub elements. Memberships of the selected template users may be reassigned to the copying user during the copying. Memberships of the selected template users may also be reassigned to a third user.

The permissions of the selected template users are reassigned to the copying user for the copied web element. The permissions are reassigned only for the copied web element. The permissions for the web element in the first location remain unchanged. The copied web element may be modified in the second location. The modification enables the web element to evolve. The copying user may define a second copy operation for the copied web element for further copying the copied web element by a second copying user. The definition of the second copy operation comprises selecting one or more of the template users for reassignment of the permissions to the second copying user.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 6A exemplarily illustrates a pseudocode segment for assigning permissions to multiple template users for multiple content blocks in a web page.

FIG. 6B exemplarily illustrates a pseudocode segment for defining the copy operations for the copying user by the element creator.

FIG. 6C exemplarily illustrates a pseudocode segment with permissions of the selected template user reassigned to the copying user.

FIG. 8 exemplarily illustrates a screenshot of a registration web page for registering a user.

FIG. 10 exemplarily illustrates a screenshot of the new client web page.

FIG. 11 exemplarily illustrates a screenshot of a web page displayed to a second user with "Staff" permissions on clicking a "Clients" link.

FIG. 13 exemplarily illustrates a screenshot of a web page providing an option to an administrative user to configure a copy block.

FIGS. 15A-15B exemplarily illustrate blocks in the structure of a web page "_Client_Simple" to be copied.

FIGS. 16A-16B exemplarily illustrate blocks in the structure of a copied web page "Joe Blow".

FIG. 17 exemplarily illustrates a comparison between permissions for a "Picture" block in the web page "_Client_Simple" and a copied "Picture" block in the copied web page "Joe Blow".

FIG. 18 exemplarily illustrates a comparison between permissions for an "Articles" block in the web page "_Client_Simple" and a copied "Articles" block in the copied web page "Joe Blow".

FIG. 19 exemplarily illustrates a comparison between permissions for a "Bulletin Boards" block in the web page "_Client_Simple" and a copied "Bulletin Boards" block in the copied web page "Joe Blow".

FIG. 21 exemplarily illustrates a screenshot of a web page comprising a "Login" block.

FIG. 22 exemplarily illustrates a screenshot of a web page for enabling the "Login" block to be configured.

FIG. 23 exemplarily illustrates the web page for enabling the "Login" block to be configured with a "copy groups and subs" check box checked.

DETAILED DESCRIPTION OF THE INVENTION

Figure 1:
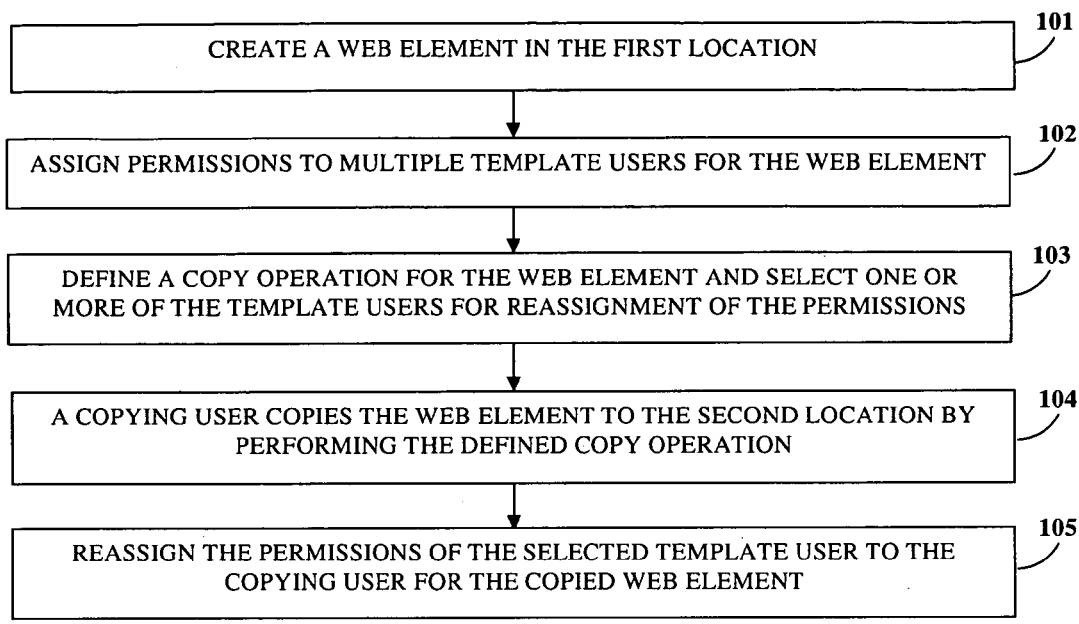
FIG. 1 illustrates a computer implemented method of copying a web element with reassigned permissions.

FIG. 1 illustrates a computer implemented method of copying a web element with reassigned permissions. As used herein, the term "element creator" is defined as a user who creates the web element, the term "copying user" is defined as a user who copies the created web element, and the term "template user" is defined a standardized model of a user with a unique set of permissions and properties. An element creator creates 101 the web element in a first location in an online environment. The web element may be, for example, a web page such as an interactive web page, a business web page, a gaming web page, a news web page, a blog, etc. The web element may also be an online data structure. The element creator may use online tools provided in the online environment to create, edit, and manage the web element. The web element may comprise multiple sub elements. For example, the sub elements may be sub pages of a web page. The web element and the sub elements may comprise multiple content blocks. The content blocks may, for example, a registration content block, a copy content block, a text block, photograph albums, calendars, discussion boards, banner blocks, articles, media content, etc.

The element creator assigns 102 the permissions for the web element to one or more of multiple template users. The permissions may also be assigned to one or more template users for a pre-existing web element on a host website in the online environment. The permissions assigned to the template user may comprise configuring, owning, and viewing the web element. For example, the permissions associated with a text block may comprise administrating, editing, viewing, approving, and managing the text block. The permissions associated with a photograph album may be administrating, configuring, creating galleries, editing galleries, deleting galleries, managing gallery images, and viewing images in the photograph album. The permissions associated with a discussion board may be administrating, configuring, managing, editing posts, deleting posts, starting threads, posting replies, and viewing articles on the discussion board. The permissions associated with a calendar may be administrating, configuring, creating, editing, deleting, approving, and managing events on the calendar.

The element creator defines 103 a copy operation for the web element for a copying user. The definition of the copy operation comprises selection of one of the template users for the reassignment of the permissions to the copying user. The selected template user is the template user whose permissions are to be reassigned to the copying user. The definition of the copy operation may further comprise definition of properties of the copy operation. The properties may be, for example, content to copy, name of copied content, parent page of copied content, definition of a group of users who may copy the web element, etc.

The copying user copies 104 the web element to the second location in the online environment by performing the defined copy operation. The copying user may copy the entire web element, multiple sub elements, or multiple content blocks from the web elements and the sub elements. The copying user must be a member of the group of users who may copy the web element as defined in the copy operation, to be able to copy the web element. A user who is not a member of the defined group may either be disallowed from copying the web element or not provided an option to copy the web element. Memberships of the selected template user may be reassigned to the copying user during the copying. Memberships of the selected template users may also be reassigned to a third user.

The permissions of the selected template users are reassigned 105 to the copying user for the copied web element. The permissions are reassigned only for the copied web element. The permissions for the web element in the first location remain unchanged. Furthermore, the permissions of the template users not selected for the reassignment remain unchanged. Hence, the unselected template users have the same permissions for the copied web element as the permissions for the web element in the first location.

The copied web element may be modified in the second location. The modification enables the web element to evolve. The copied web element may also be renamed in the second location. The copying user may define a second copy operation for the copied web element for further copying the copied web element by a second copying user. The definition of the second copy operation comprises selecting one or more of the template users for reassignment of the permissions to the second copying user.

The copied web element may further be modified by the copying user in the second location. The modifications made by the copying user may provide the web element with improved usability or functionality for a specific application. For example, the web element in the first location may be a simple query web page. The second user may modify the simple query web page after copying, to provide improved usability for conducting a search in an online sale. The copied web element thereby evolves to accommodate new applications.

Figure 2:
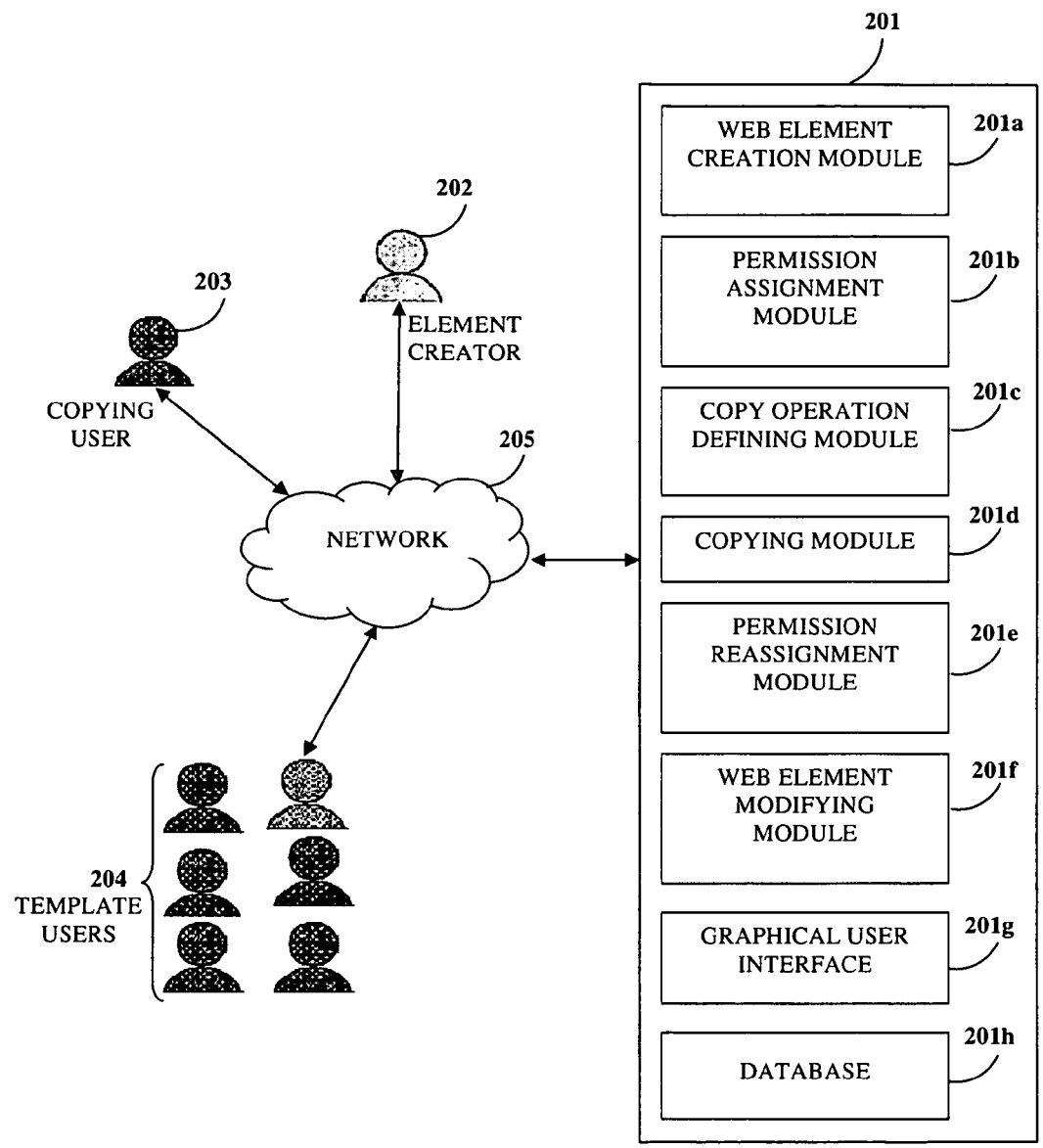
FIG. 2 illustrates a computer implemented system for copying a web element with reassigned permissions, FIG. 3A exemplarily illustrates hierarchy of sub pages of a school web page with assigned permissions at different levels of the hierarchy.

FIG. 2 illustrates a computer implemented system 201 for copying a web element with reassigned permissions. The computer implemented system 201 disclosed herein comprises a web element creation module 201a, a permission assignment module 201b, a copy operation defining module 201c, a copying module 201d, a permission reassignment module 201e, a web element modifying module 201f, a graphical user interface (GUI) 201g, and a database 201h. The element creator 202, the copying user 203, and multiple template users 204 access the system 201 via a network 205.

The web element creation module 201a creates the web element in a first location in an online environment. The web element may, for example, be a web page such as an interactive web page, a business web page, a gaming web page, a news web page, a blog, etc. The web element may also be an online data structure. The web element creation module 201a may use online tools provided by the GUI 201g in the online environment to create, edit, and manage the web element. The web element may comprise multiple sub elements. The web element and the sub elements may comprise multiple content blocks. The content blocks may, for example, be a registration content block, a copy content block, a text block, photograph albums, calendars, discussion boards, banner blocks, articles, media content, etc. The content blocks are stored in a database 201h.

The permission assignment module 201b assigns the permissions to one or more template users 204 for the web element. The permission assignment module 201b also assigns the permissions to the template users 204 for a pre-existing web element on a host website in the online environment. The permission assignment module 201b may assign permissions comprising, for example, configuring, owning, and viewing the web element, to the template users 204.

The copy operation defining module 201c defines a copy operation for the web element for the copying user 203. The definition of the copy operation comprises selecting one or more of the template users 204 for reassignment of the permissions to the copying user 203. The copy operation defining module 201c further defines properties of the copy operation. The properties may be, for example, content to copy, name of copied content, parent page of copied content, definition of a group of users who may copy the web element, etc.

The copying module 201d copies the web element to a second location in the online environment by performing the defined copy operation. The copying module 201d may copy the entire web element, multiple sub elements, or multiple content blocks from the web elements and the sub elements. The copying module 201d may reassign memberships of the selected template users 204 to the copying user 203 during the copying. The copying module 201d may also reassign memberships of the selected template users 204 to a third user.

The permission reassignment module 201e reassigns the permissions of the selected template users 204 to the copying user 203 for the copied web element. The permission reassignment module 201e reassigns the only for the copied web element. The permission reassignment module 201e does not change permissions for the web element in the first location.

The web element modifying module 201f modifies the copied web element. The web element modifying module 201f enables evolution of the web element. The web element modifying module 201f may also rename the copied web element. The new name for the copied web element may be selected by the copying user 203.

The GUI 201g provides online tools for creating and managing the web element in the first location and the copied web element in the second location. The online tools may comprise software tools for building the web element and structuring layout, content, and aesthetics of the web element. The GUI 201g may further comprise multiple web screens and multiple forms for defining content blocks on the web element. The database 201h stores the content blocks, the permissions assigned to the template users 204 and the copying user 203, and user information. The user information may comprise user registration information and user login information.

Consider an example where an element creator 202 creates a web element and allows the web element to be copied by a copying user 203 by defining a copy operation and providing a copy link on the web element. The web element may be a business web page. The element creator 202 may use the properties during the definition of the copy operation to allow new customers to upload images and fill forms on a sub page created under a "list of customers" page. However, the new customers may not be assigned permissions to create a new sub page under the "list of customers" page. The element creator 202 may reserve permissions to create a sub page under the "list of customers" page.

In another example, a link for "new community" is created within a community web page such that when the "new community" link is clicked, multiple sub pages for new sub communities such as "flea market", "parade", or "crime watch" are created. In a third example, a gymnastics related website may have links for "new level". Multiple sub pages for coordination of a training track such as "level 7" are created each time the "new level" link is clicked. Within the "level 7" sub pages copy links may be provided for "new gymnast". For each "new gymnast" page created by the element creator 202, copy links may be provided for "new meet". In each "new meet" page, sub pages suitable for presentation of meet scores and pictures may be created.

Figure 3A:
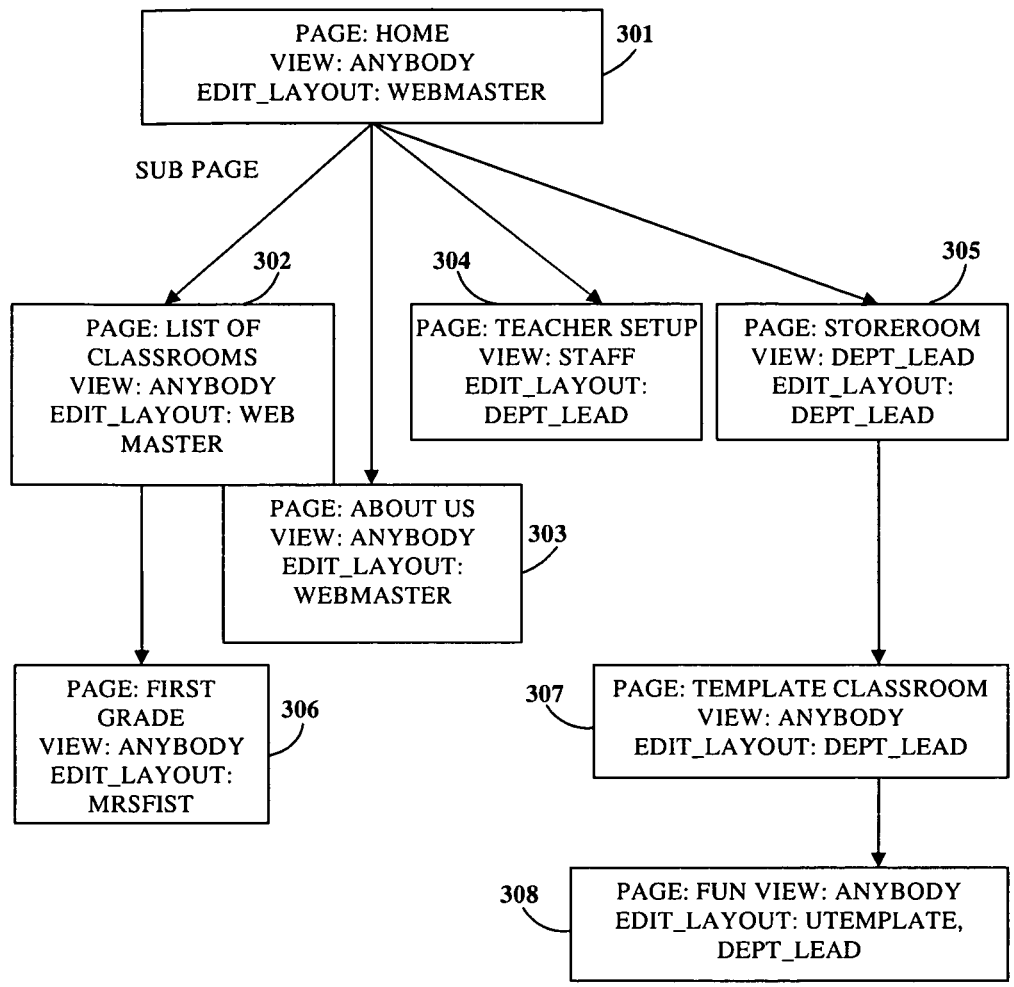
FIG. 3B exemplarily illustrates content blocks with assigned permissions on sub pages of the school web page.
FIG. 3C exemplarily illustrates the result of a copy operation performed by a copying user.

Consider a fourth example of a school comprising teachers, department leads, classrooms, and students. The school may have a web page allowing the teachers, the department leads, the classrooms, and the students to manipulate parts of the school web page. FIG. 3A exemplarily illustrates hierarchy of sub pages of the school web page with assigned permissions at different levels of the hierarchy. A web page "Home" 301 comprises sub pages "List of Classrooms" 302, "About Us" 303, "Teacher Setup" 304, and "Storeroom" 305. The sub page "List of Classrooms" 302 comprises a sub page "First Grade" 306. The sub page "Storeroom" 305 comprises a sub page "Template Classroom" 307. The sub page "Template Classroom" 307 comprises a sub page "Fun" 308. The permissions for each sub page are illustrated within the sub page. The web page "Home" 301 and the sub pages "List of Classrooms" 302, "About Us" 303, and "First Grade" 306 have a "view" permission assigned to "anybody", therefore may be viewed by any user.

The sub page "Teacher Setup" 304 assigns the permission "view" only to members of a user group "Staff". Therefore, only users with memberships in the user group "Staff" may view the "Teacher Setup" 304 page. The sub page "Storeroom" 305 assigns the "view" permission to a user "Dept_Lead". Therefore only the user "Dept_Lead" may view the sub page "Storeroom" 305. The sub page "Template Classroom" 307 assigns the "view" permission to "anybody", but in the website navigation hierarchy sub page "Template Classroom" 307 may be accessed only through the sub page "Storeroom" 305. Since the sub page "Storeroom" 305 has assigned the "view" permission only to the user "Dept_Lead", only the user "Dept_Lead" may be allowed to view the sub page "Template Classroom" 307.

Figure 3B:
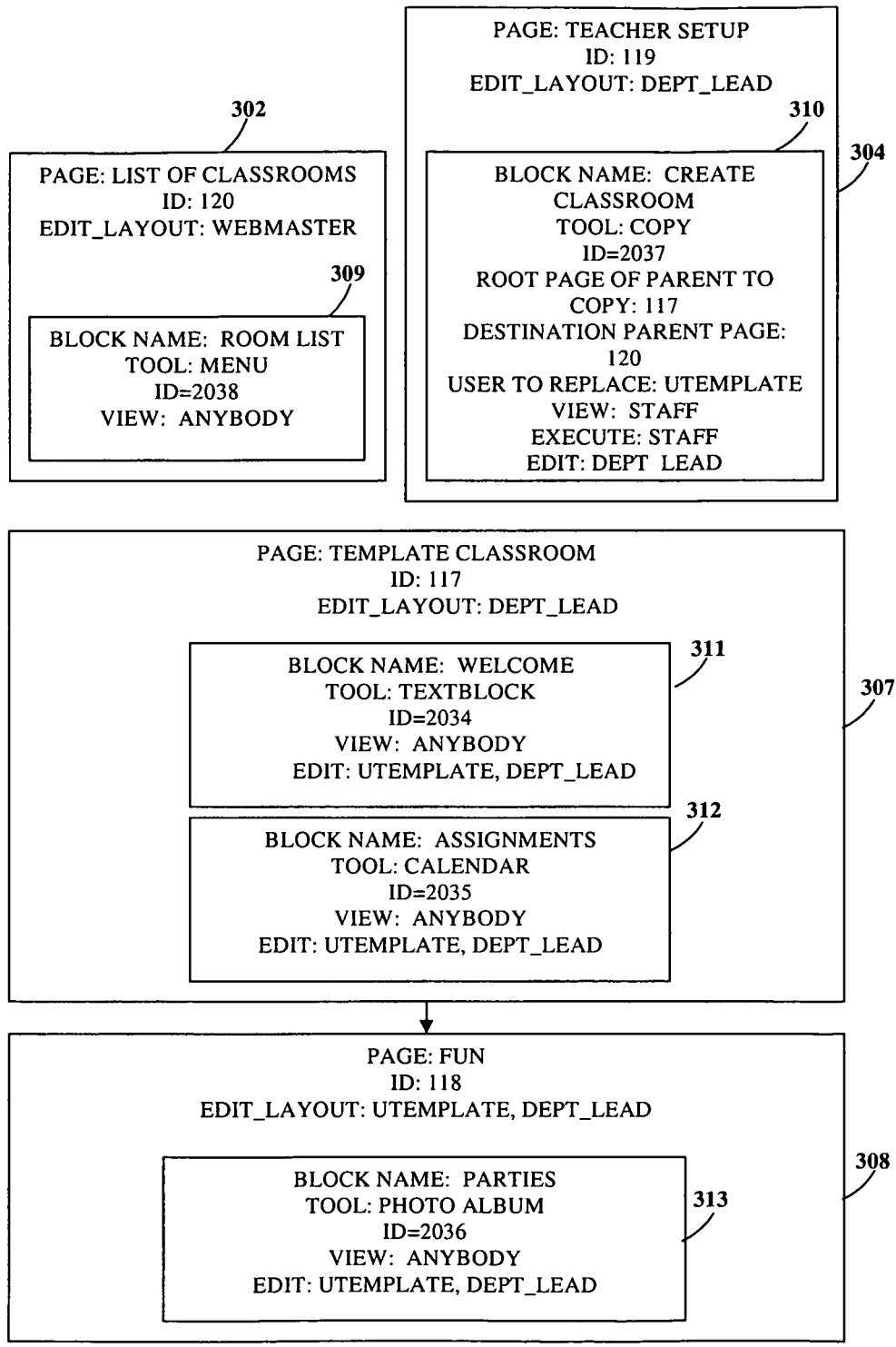

FIG. 3B exemplarily illustrates content blocks with assigned permissions on sub pages of the school web page. Identifiers (ids) may be included for the web pages as the web page name may not be distinct. The identifiers are unique codes that help identify the web pages. For example, there may be a sub page named "Fun" 308 under each of the web pages for multiple classrooms. Then, the different sub pages named "Fun" are uniquely identified by the unique id included within each of the web pages. Each of the multiple content blocks of the sub pages are presented and manipulated using multiple tools on the website. The web page "List of Classrooms" 302 comprises a menu block 309 with the "view" permission assigned to "anybody". A user viewing the page "List of Classrooms" 302 sees a menu of the sub pages. The sub page "Template Classroom" 307 may have a "Welcome" block 311 and an "Assignments" block 312. The sub page "Fun" 308 may have a "Parties" block 313. With the permissions as illustrated in FIG. 3B, "Dept_Lead" may edit each of the sub pages and content blocks. A user "Utemplate" may edit the content blocks and may edit the layout of the "Fun" 308 sub page but may not edit the layout of the "Template Classroom" 307 sub page.

Figure 3C:
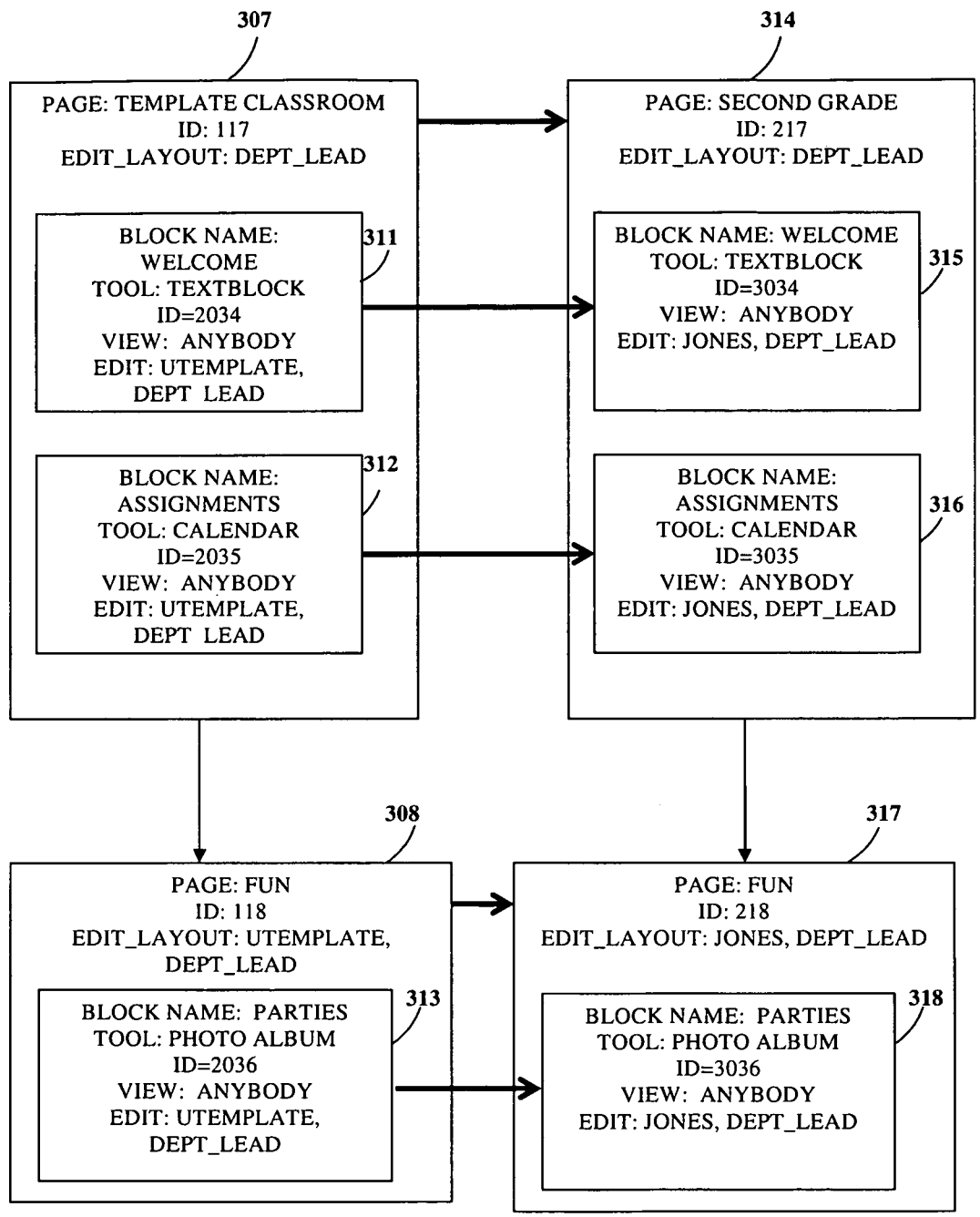

A teacher may want to have web pages in the website for their classroom. For example, the second grade teacher named "Jones" may want to have a web page for a second grade classroom. FIG. 3C exemplarily illustrates the result of a copy operation performed by a copying user 203, Jones. The web pages "Template Classroom" 307 and "Fun" 308 are copied by Jones and the permissions of the selected template user "Utemplate" are assigned to Jones for the copied web pages "Second Grade" 314 and "Fun" 317. The copied web page "Second Grade" 314 comprises a "Welcome" block 315 and an "Assignments" block 316. The copied web page "Fun" 317 comprises a "Parties" block 318. In FIG. 3C, "Dept_Lead" may also have permissions to edit each of the multiple content blocks in each of the sub pages copied by Jones, as the permissions originally assigned to "Dept_Lead" remain unchanged.

The "Create Classroom" block 310 illustrated in FIG. 3B may be configured such that the sub page copied is the "Template Classroom" 307 sub page. The "Create Classroom" block 310 may be configured to place the copied sub pages as sub pages of the "List of Classrooms" 302 sub page. The "Create Classroom" block 310 may be further configured to reassign the permissions of the selected template user "Utemplate" to the copying user 203, Jones. The permissions for the "Create Classroom" block 310 allows only members of the "Staff" group to view the copy link and perform the copy operation. "Dept_Lead" may edit the "Create Classroom" block 310 and modify the configuration of the "Create Classroom" block 310. The copying module 201*d* performs the copy operation using the permissions of "Dept_Lead". The web page "List of Classrooms" 302 assigns "Edit Layout" permissions to "Dept_Lead" allowing the creation of sub pages. Jones may be a member of the "Staff" group. Jones uses the "Create Classroom" block 310 by clicking on the "Create Classroom" button to copy the web page and the sub pages to a second location.

Figure 4:
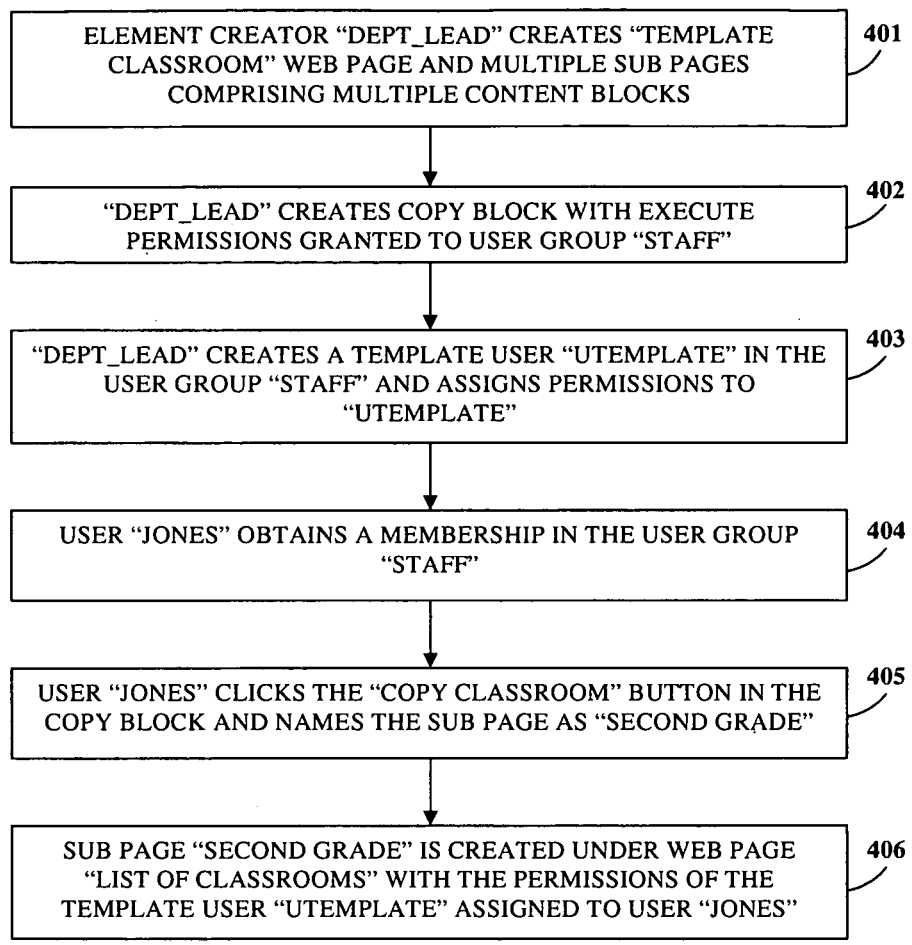
FIG. 4 exemplarily illustrates the process involved in execution of a copy operation in the school web page.

FIG. 4 exemplarily illustrates the process involved in execution of a copy operation in the school web page. An element creator 202 "Dept_Lead" creates 401 "Template Classroom" web page and multiple sub pages comprising multiple content blocks. "Dept_Lead" creates 402 a copy block with execute permissions assigned to a user group "Staff". "Dept_Lead" creates 403 a template user "Utemplate" in the user group "Staff" and assigns permissions to "Utemplate". A copying user 203 "Jones" obtains 404 a membership in the user group "Staff". The copying user 203 "Jones" clicks 405 the "Copy Classroom" button in the copy block and names the sub page "Second Grade". A new sub page named "Second Grade" is created 406 under web page "List of Classrooms" with the permissions of the template user "Utemplate" assigned to user "Jones".

Figure 5:
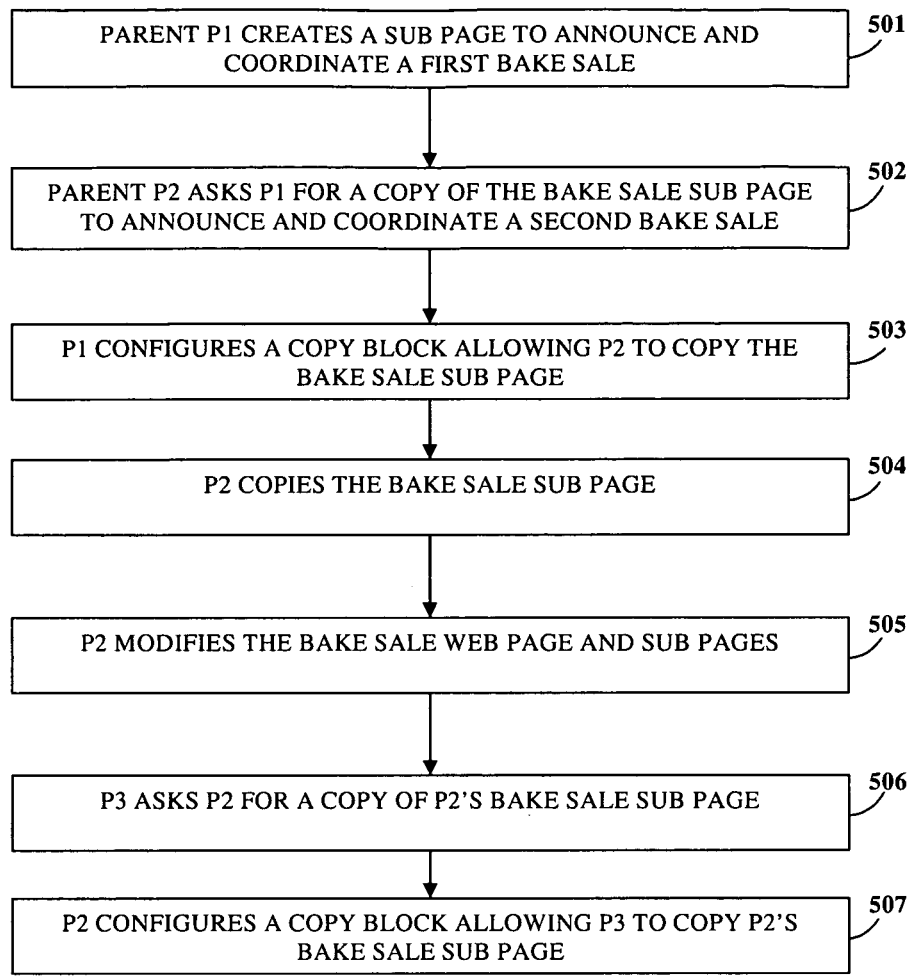
FIG. 5 exemplarily illustrates the process involved in using the school web page for a school bake sale.

FIG. 5 exemplarily illustrates the process involved in using the school web page for a school bake sale. A first parent P1 may be responsible for a first bake sale and may create 501 a sub page for announcing and coordinating the bake sale. A second parent P2 may be impressed with the bake sale sub page and ask 502 P1 for a copy of the bake sale sub page to announce and coordinate a second bake sale. Other parents may also ask for a copy of the bake sale sub page. P1 may configure 503 a copy block allowing P2 and the other parents to copy the bake sale sub page. P2 copies 504 the bake sale page. P2 may modify 505 the bake sale sub page of P1. The modifications made by P2 may improve the usability or functionality of the bake sale sub page for conducting the bake sale. A third parent P3 may want to make a copy of the bake sale sub page of P2 and may ask 506 P2 to allow P1 to make a copy. P2 may configure 507 a copy block allowing P3 to copy the bake sale sub page. P3 and the other parents may also modify the copied bake sale sub page. Hence, the bake sale sub page evolves with each improvement made to the usability or functionality of the bake sale sub page.

FIG. 6A exemplarily illustrates a pseudocode segment for assigning permissions to multiple template users 204 for multiple content blocks in a web page. The pseudocode segment may be created by the element creator 202. The pseudocode segment in FIG. 6A creates a web page named "Classroom_X" 202 in a first location in an online environment and assigns "view" permission to "anybody" and "edit structure" permission to the template users 204 "Template_Teacher" and "Teaching_Supervisors_Group". The web page comprises multiple content blocks "Welcome to the Classroom", "School Announcements", and "Calendar of Assignments". The pseudocode segment assigns different permissions for each of the content blocks to template users 204 Template_Teacher, Teaching_Supervisors_Group, Office_Staff_Group, and Substitute_Teachers_Group, as illustrated in FIG. 6A.

FIG. 6B exemplarily illustrates a pseudocode segment for defining the copy operation for the copying user 203 by the element creator 202. The element creator 202 defines the name of the copy link as "Add a Classroom", the content to copy as the web page "Classroom_X" and parent page of copied content as "List_of_Classrooms". Further, the element creator 202 selects one of the template users 204 "Template_Teacher" for the reassignment of the properties of the copy operation. The element creator 202 defines the copy operations such that only members of the user group "Teaching_Staff_Group" may perform the copy operation.

FIG. 6C exemplarily illustrates a pseudocode segment with permissions of the selected template user reassigned to the copying user 203. In FIG. 6C, the copying user 203 is named "Miss_Melinar". "Miss_Melinar" must be a member of the user group "Teaching_Staff_Group" to be able to perform the copy operation. A user who is not a member of the user group "Teaching_Staff_Group" may not be allowed to perform the copy operation. The web page "Classroom_X" is copied from the first location to a second location in the online environment and is renamed "Miss_Melinar's Classroom". The permissions assigned to the selected template user in the web page "Classroom_X" are reassigned to the copying user 203 "Miss_Melinar". The selected template user "Template_Teacher" is replaced in the pseudocode with the copying user 203 "Miss_Melinar". The replacement of "Template_Teacher" with "Miss_Melinar" is exemplarily illustrated using a bold typeface in FIG. 6C.

Group memberships of the selected template users 204 are reassigned to the copying user 203. On registration, the copying user 203 has group memberships equivalent to the group memberships of the selected template users 204. For example, in a school webpage, a registering teacher may be added to the groups "Staff", "Policy Announcements" and "Yard Duty". Depending on the policies of the website and the school, the teacher may be able to withdraw from some of these groups. However, a larger number of group memberships of a new teacher may help the new teacher adapt to the policies of the school.

The element creator 202 may configure the copy operation to assign the permissions to a third user instead of assigning the permissions to the copying user 203. Then, the copying user 203 may copy the web element to the second location, but the permissions for the copied web element are assigned to the third user. For example, the user "Dept_Lead" may perform the copy operation for multiple classrooms in a department with the permissions reassigned to a different teacher for each of the classrooms.

Figure 7:
FIG. 7 exemplarily illustrates a screenshot of a web page prompting the user to register with a business website.

Consider an example of a business website "O'Reilly and Goldstein, CPAs". A user visits the business website. If the user is not registered with the business website, the user is prompted to register with the business website and is provided a link to a registration webpage. A screenshot of a web page prompting the user to register with the business website is exemplarily illustrated in FIG. 7. The user clicks on the link and is directed to the registration webpage. The user provides user identification information, for example, electronic mail (email) address, name of the user, a username, and a password. A screenshot of a registration web page for registering a user is exemplarily illustrated in FIG. 8. The user completes the registration by clicking on a "Save" button.

Figure 9:
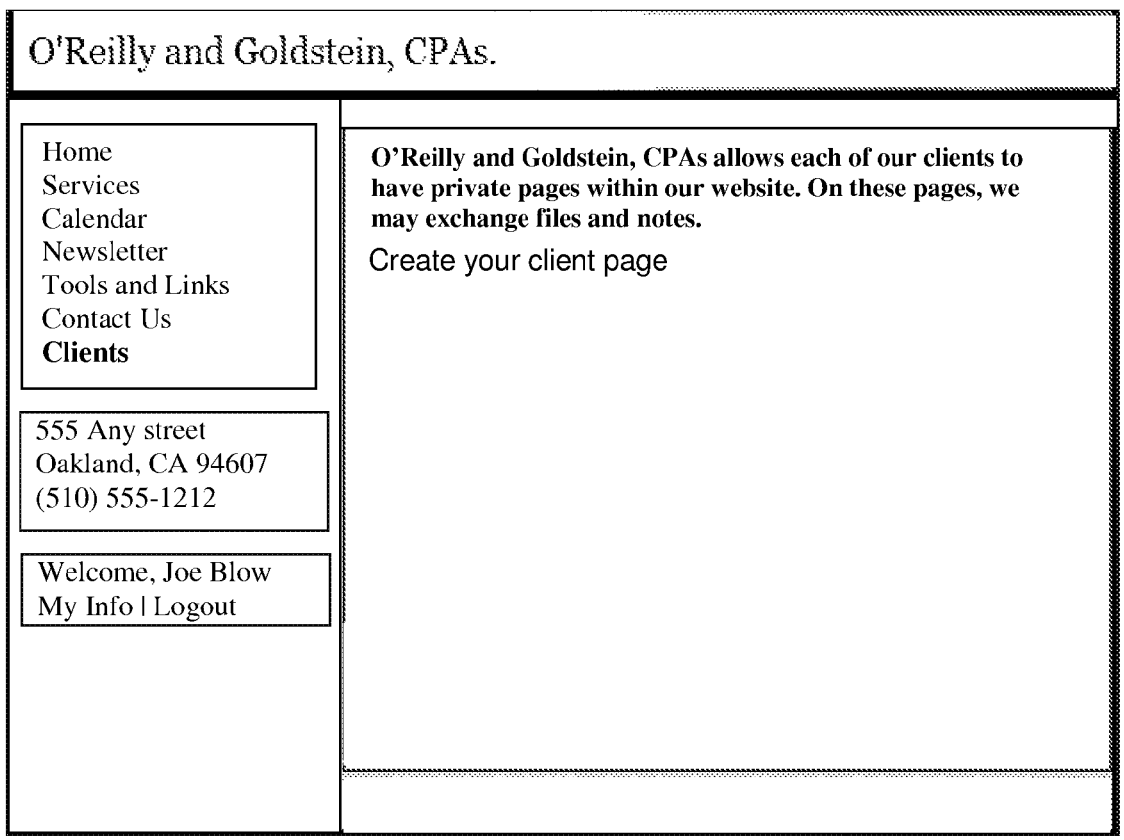
FIG. 9 exemplarily illustrates a screenshot of a web page providing the user a link to perform the copy operation and create a new client web page.
Figure 10:
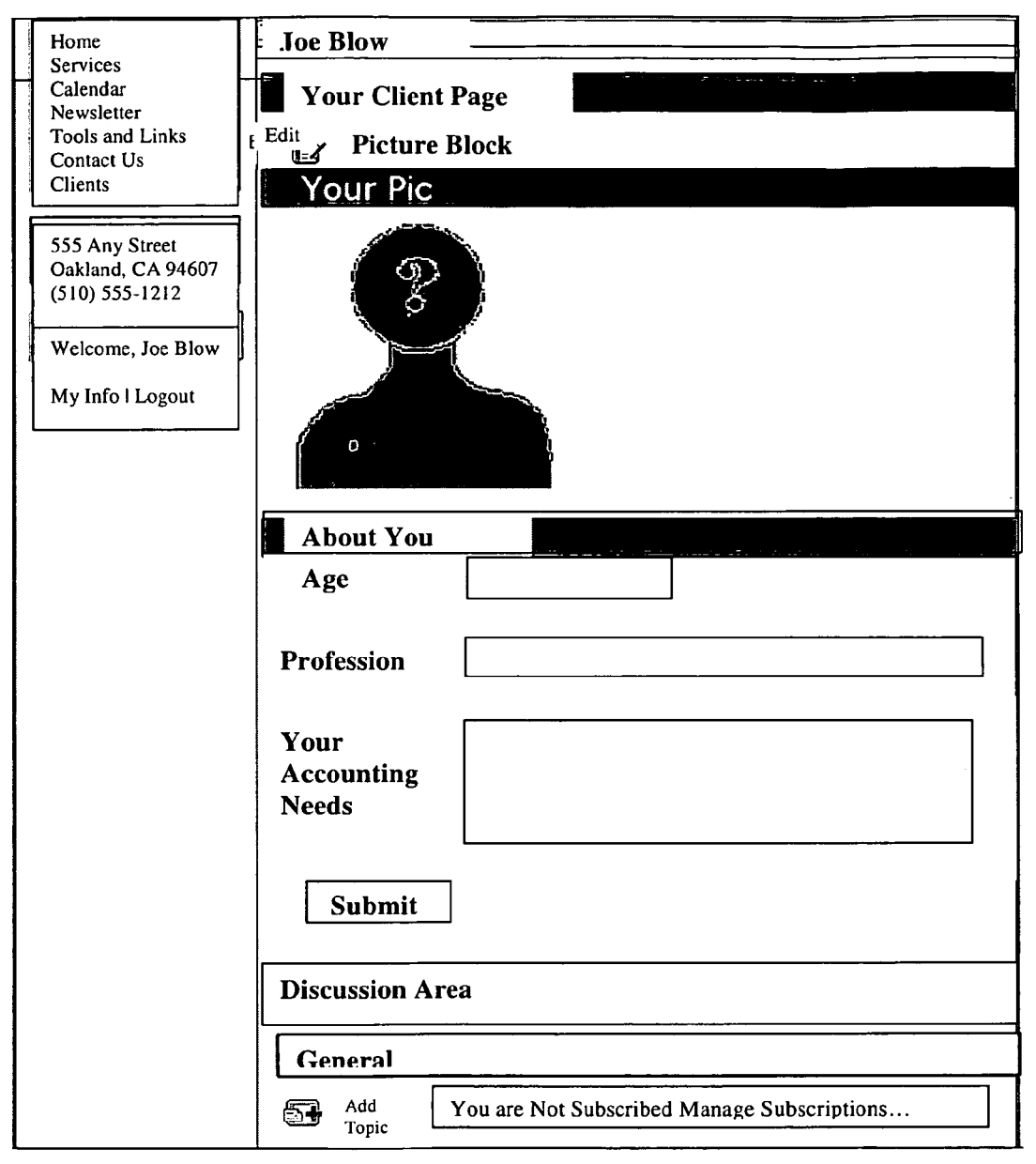

The user is then redirected to a web page "Clients". The web page "Clients" may only be accessed by registered users, therefore the user is granted access to the web page "Clients" after registration. The web page "Clients" may provide the user a "Create Your Client Page" link for enabling the user to create a new client web page. A screenshot of the "Clients" web page providing the user a link to perform the copy operation and create a new client web page is exemplarily illustrated in FIG. 9. On clicking the link to create a new client web page, a new client web page is created for the user and the user is redirected to the new client web page. The new client web page is created by copying a client web page stored in a first location in the online environment. "Edit" permissions are assigned to the user for the new client web page. In this example, the new client web page is the copied web element. Since the user is assigned "edit" permissions for some web elements, the user may edit those web elements in the new client page by adding a picture, contact details, name, age, profession, etc, of the user. A screenshot of the new client web page is exemplarily illustrated in FIG. 10.

The new client web page is a sub page of the web page "Clients" The new client web page may be the only sub page of the web page "Clients" accessible by the user on clicking a "Clients" link on the web page, since the user may have permissions only to access the new client web page. A third user who may have "Staff" permissions may be able to access different client web pages created by different users. On clicking the "Clients" link, a list of client web pages may be displayed to the third user who may be permitted to access the client web pages. Similarly, different blocks may be displayed on a single web page to different users based on the permissions assigned to the users. A screenshot of a web page displayed to the second user with "Staff" permissions on clicking the "Clients" link is exemplarily illustrated in FIG. 11.

Figure 12:
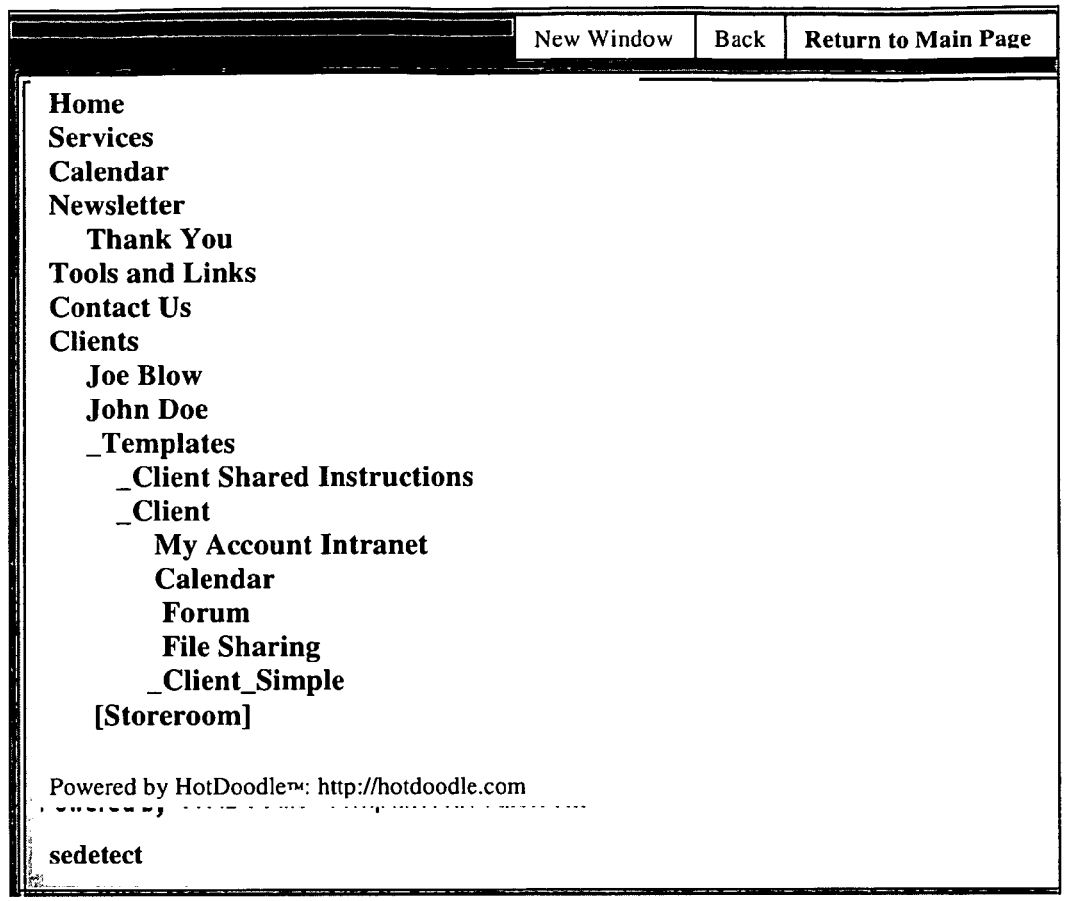
FIG. 12 exemplarily illustrates page hierarchy of the business website after the user creates the new client web page.

FIG. 12 exemplarily illustrates page hierarchy of the business website after the user creates the new client web page. In FIG. 12, the web element to be copied is the web page named "_Client_Simple" stored in a first location "_Templates". The web page "_Client_Simple" is copied by the user to a second location "Clients" and renamed to "Joe Blow". The first location "_Templates" may be a web page named "_Templates" with the web page "_Client_Simple" as a sub page. The second location "Clients" may be a web page named "Clients" with the web page "Joe Blow" as a sub page.

Figure 14A:
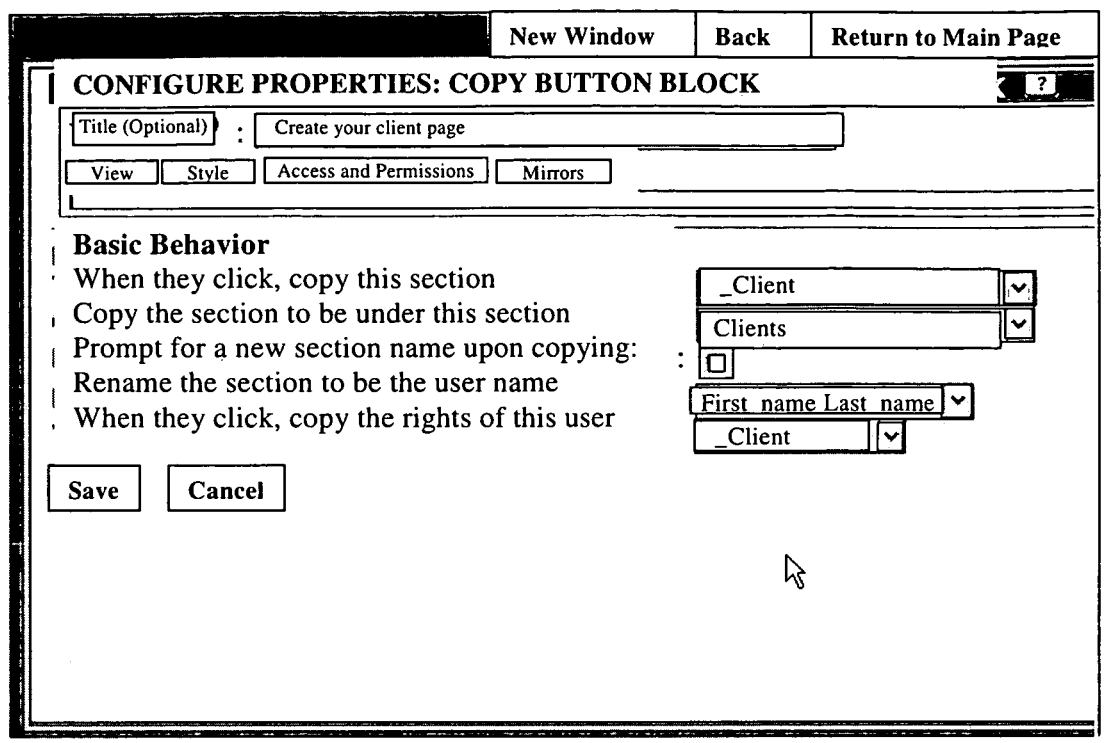
FIGS. 14A-14C exemplarily illustrate screenshots of web pages providing configuration options to the administrative user for the copy block.
Figure 14B:
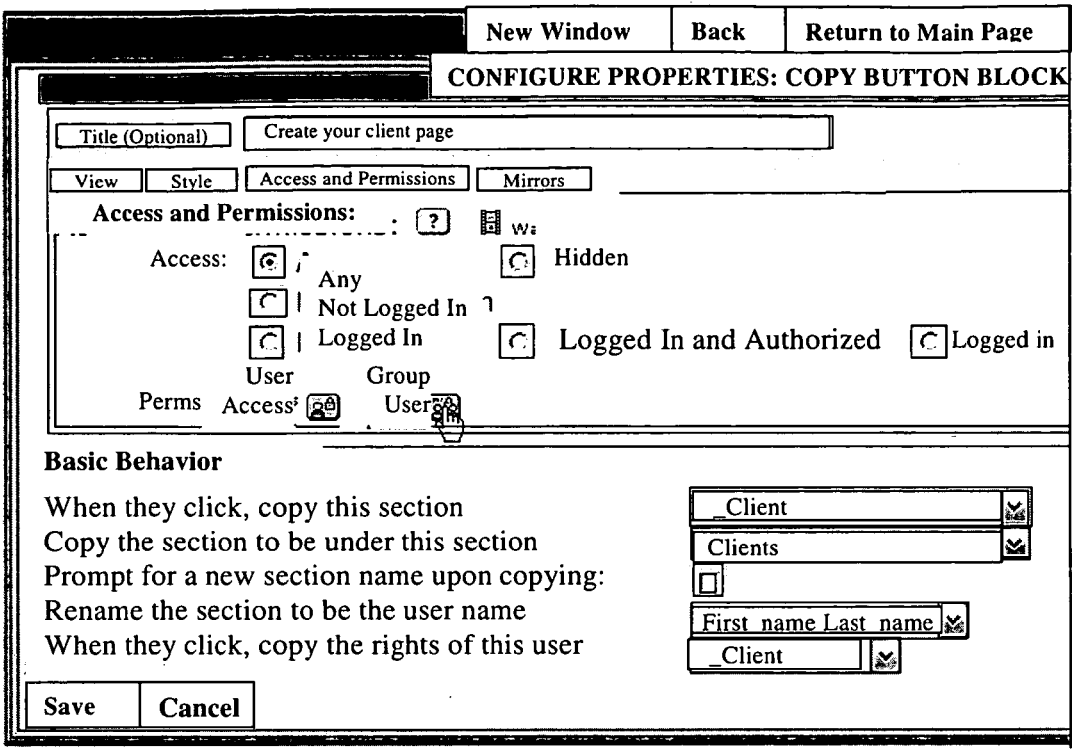
Figure 14C:
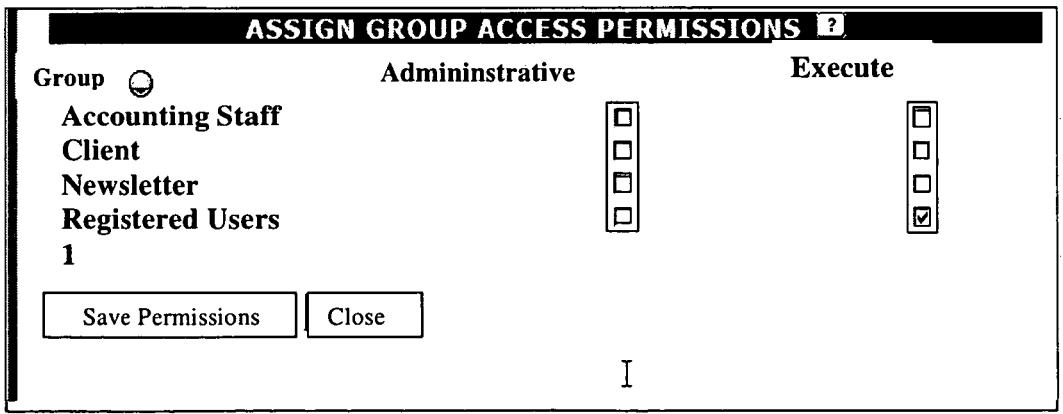

The "Create Your Client Page" link on the web page "Clients" illustrated in FIG. 13 may be referred to as a "copy block". The copy block may be configured by an administrative user with "edit" permissions for the copy block. The administrative user may configure the web element to be copied, content from the web element to be copied, first location to copy the web element from, second location to copy the web element to, and select one or more of the template users 204 for reassigning the permissions to the copying user 203. A screenshot of a web page providing a link to the administrative user to configure the copy block is exemplarily illustrated in FIG. 13. Screenshots of web pages providing configuration options to the administrative user for the copy block are exemplarily illustrated in FIGS. 14A-14C. In FIG. 14C, members of a user group "Registered Users" are assigned "execute" permissions. Hence, all members of the user group "Registered Users" may use the copy block to copy the web element to the second location.

Figure 15A:
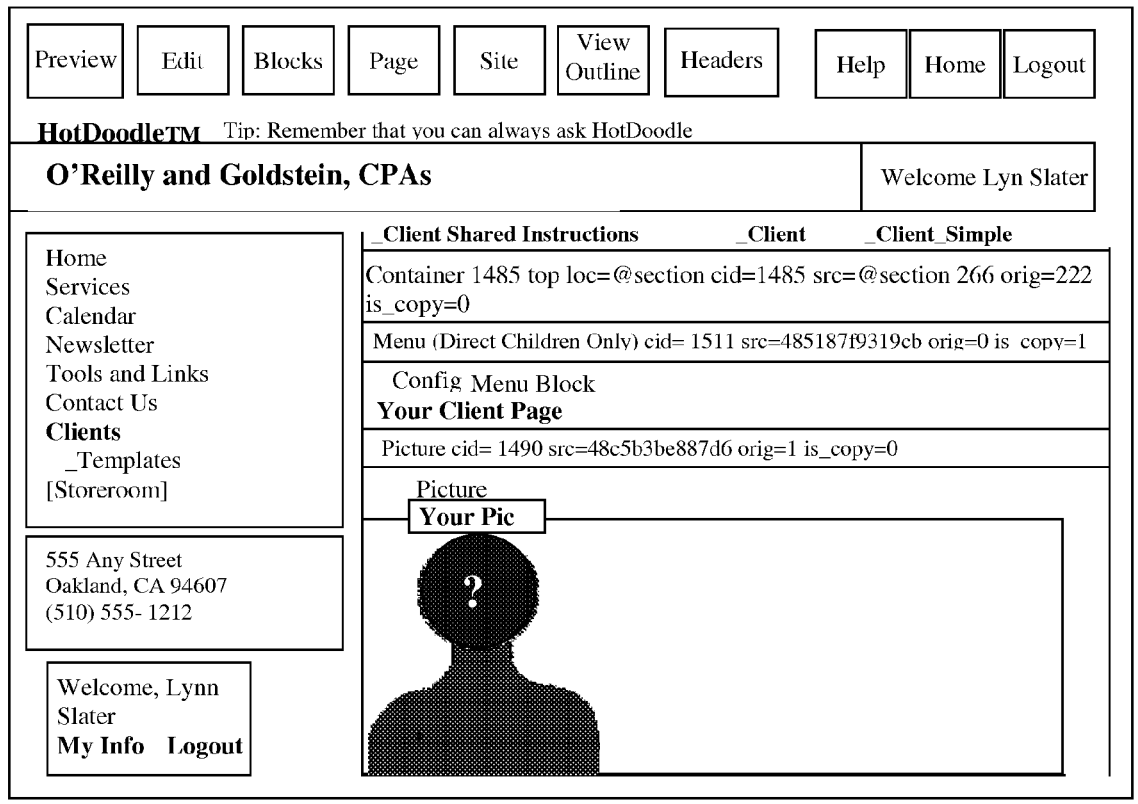

FIGS. 15A-15B exemplarily illustrate blocks in the structure of the web page "_Client_Simple" to be copied. The web page "_Client_Simple" comprises a "Container" block with id "@section266". The "Container" block comprises a "Menu" block with id "485187f9319cb", a "Picture" block with id 48c5b3be887d6, an "Articles" block with id "48c5b3e0b22f0", and a "Bulletin Boards" block with id "48c5b4564a952".

Figure 16A:
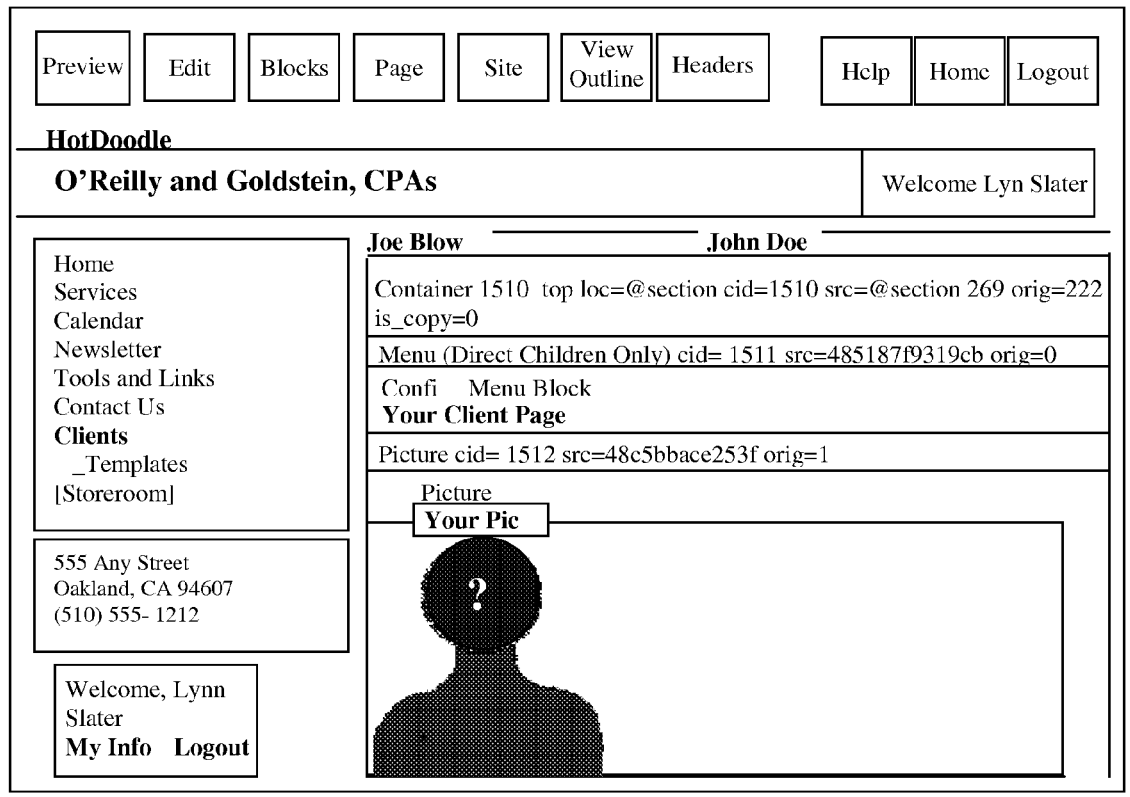

FIGS. 16A-16B exemplarily illustrate blocks in the structure of the copied web page "Joe Blow". The copied web page "Joe Blow" comprises a "Container" block with id "@section269", which is a copy of the "Container" block in the web page "_Client_Simple" with id "@section266". The copied "Container" block comprises a "Menu" block, a copied "Picture" block, a copied "Articles" block, and a copied "Bulletin Boards" block. The "Menu" block is the same "Menu" block in the web page "_Client_Simple" with id "485187f9319cb", since the "Menu" block has no content specific to the copied web page. The "Menu" block is shared among the web pages, sub pages, and copied web pages.

The id of the copied "Picture" block is "48c5bbace253f". The copied "Picture" block is a copy of the "Picture" block with id "48c5b3be887d6" in the web page "_Client_Simple". The id of the copied "Articles" block is "48c5bbacea81c". The copied "Articles" block is a copy of the "Articles" block with id "48c5b3e0b22f0" in the web page "_Client_Simple".

The id of the copied "Bulletin Boards" block is "48c5bbad08850". The copied "Bulletin Boards" block is a copy of the "Bulletin Boards" block with id "48c5b4564a952" in the web page "_Client_Simple".

Figure 17:
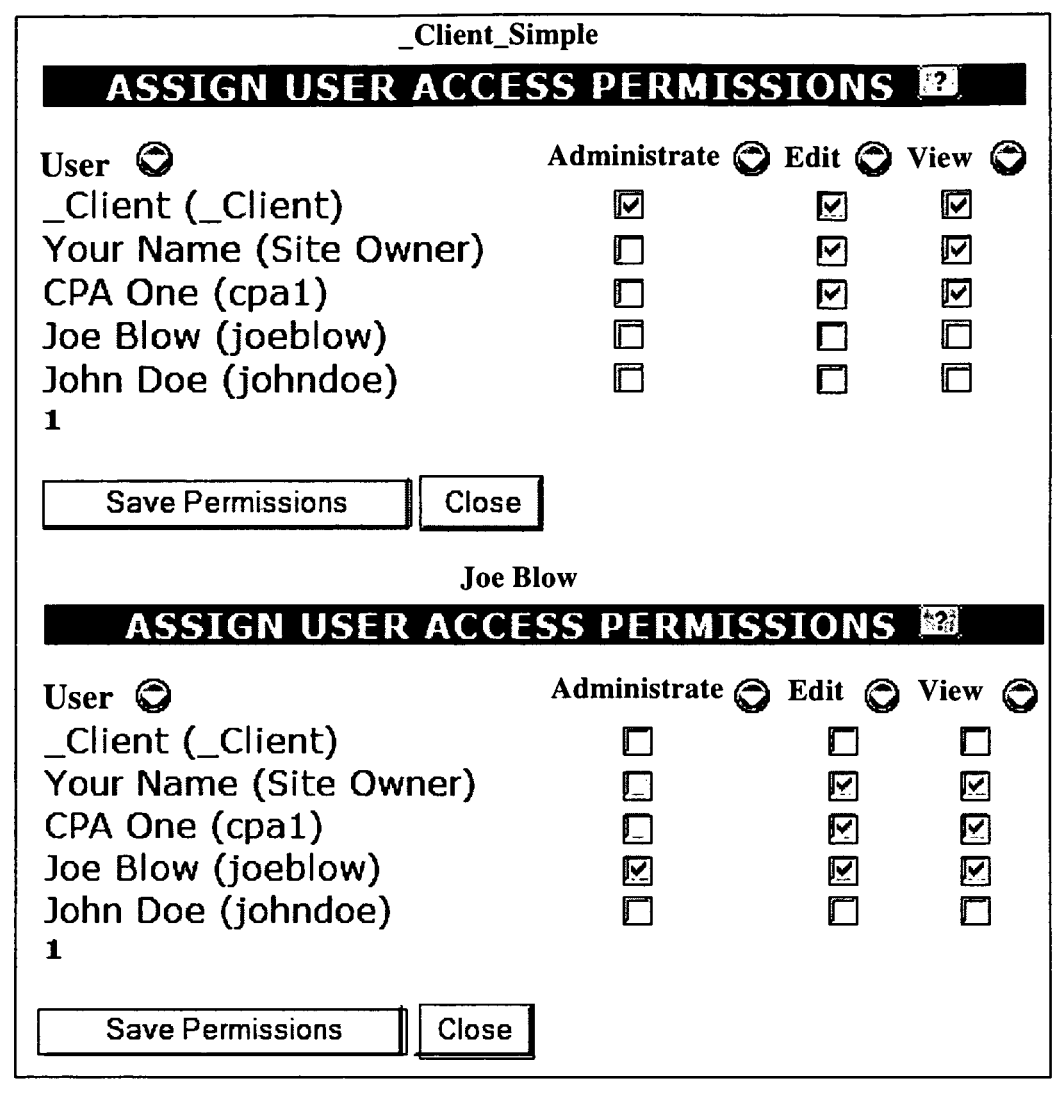
Figure 19:
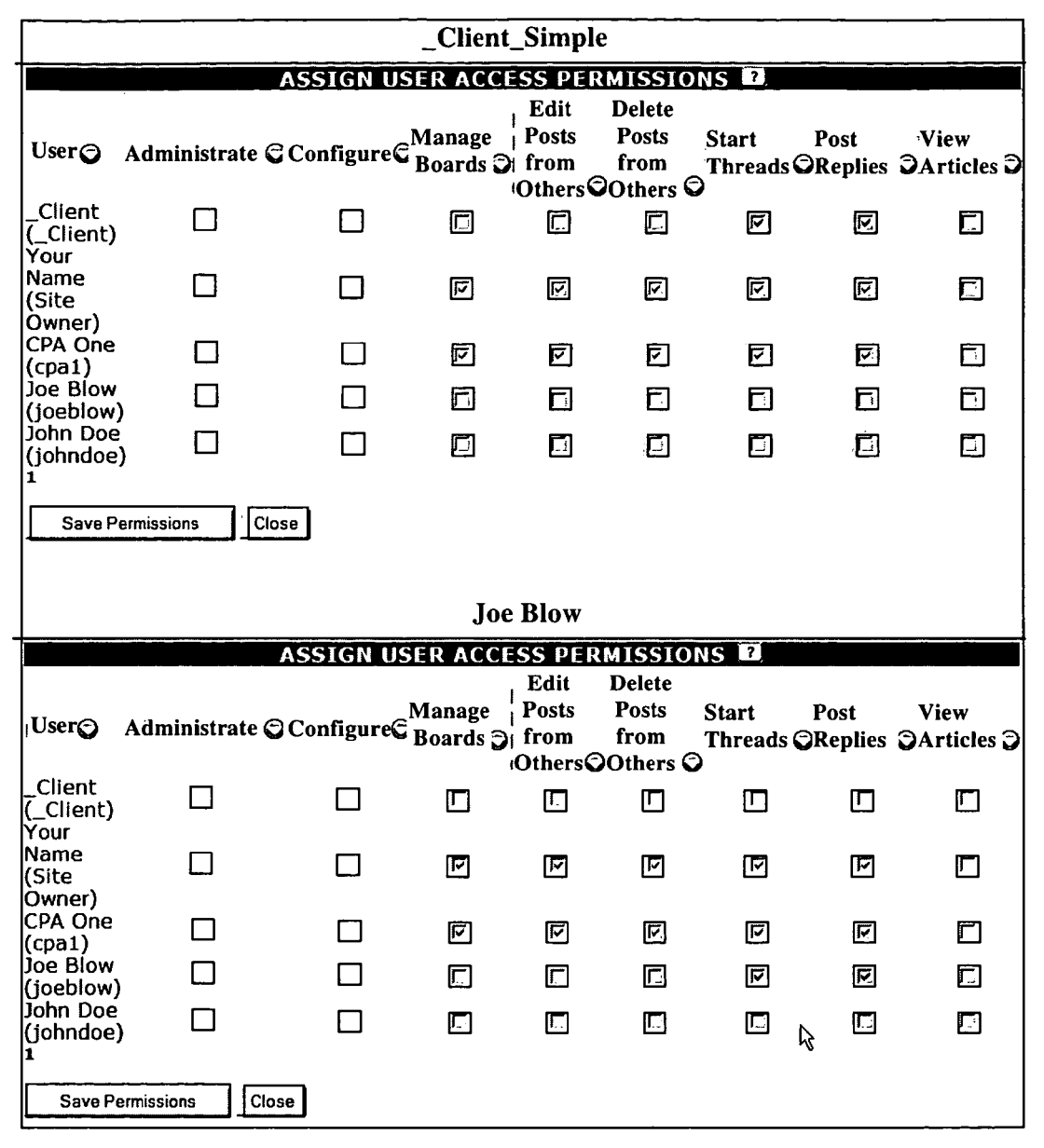

The blocks in the copied web page "Joe Blow" have reassigned permissions. The permissions of the selected template users 204 are reassigned to the copying user 203. In this example, the copying user 203 is Joe Blow. A comparison between permissions for the "Picture" block in the web page "_Client_Simple" and the copied "Picture" block in the copied web page "Joe Blow" is exemplarily illustrated in FIG. 17. A comparison between permissions for the "Articles" block in the web page "_Client_Simple" and the copied "Articles" block in the copied web page "Joe Blow" is exemplarily illustrated in FIG. 18. A comparison between permissions for the "Bulletin Boards" block in the web page "_Client_Simple" and the copied "Bulletin Boards" block in the copied web page "Joe Blow" is exemplarily illustrated in FIG. 19.

In the example illustrated above, the web page to be copied "_Client_Simple" is a single web page without sub pages. The copy block may also be configured to copy a web page with multiple sub pages. For example, the copy block may be configured to copy the web page "_Client" from the page hierarchy illustrated in FIG. 12. In FIG. 12, the web page "_Client" comprises sub pages "My Account Intranet", "Calendar", "Forum", and "File Sharing". If the copy block is configured to copy a web page with sub pages, the copied web page comprises copied sub pages which are copies of the sub pages of the web page.

Figure 20:
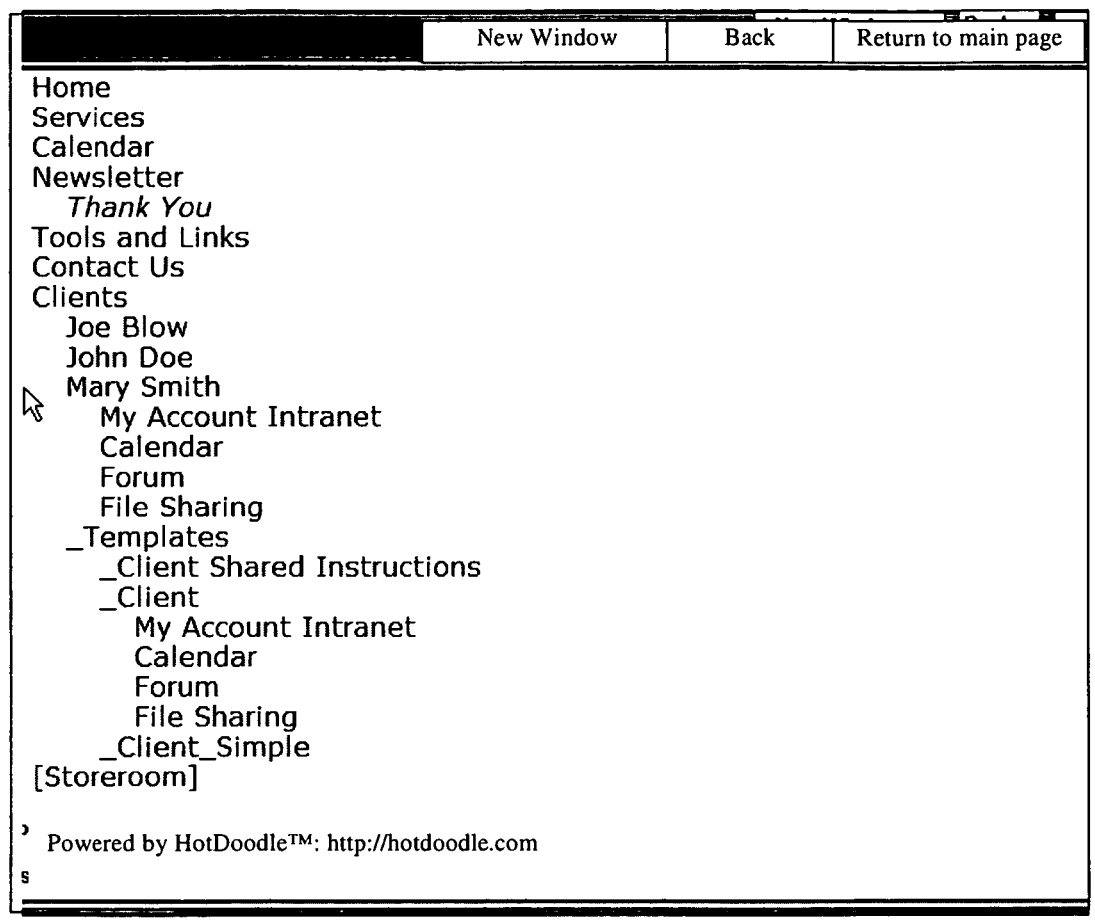
FIG. 20 exemplarily illustrates page hierarchy of the business website after a web page comprising sub pages is copied.

If a user named Mary Smith copies the web page "_Client" to a second location in the online environment using the copy block, the sub pages "My Account Intranet", "Calendar", "Forum", and "File Sharing" also get copied to the second location with permissions of the selected template user reassigned to Mary Smith. The copied web page may be named "Mary Smith" and may be a sub page of the web page "Clients". The page hierarchy of the business website after the web page comprising sub pages is copied is exemplarily illustrated in FIG. 20. As illustrated in FIG. 20, the copied web page named "Mary Smith" is a sub page of the web page "Clients" and comprises sub pages "My Account Intranet", "Calendar", "Forum", and "File Sharing".

The copy operation may be initiated upon registration by the copying user 203 using information from the registration as the name of the root of the copied web element. The copy operation operates under the permissions defined by the element creator 202. For example, if a user registers at a community site, the computer implemented system 201 disclosed herein creates a page named after the user and places the created user page under the "User Profiles" area with the user's name as the page name. The user may edit the web page but other users may not be permitted to edit the web page of the user.

FIG. 21 exemplarily illustrates a screenshot of a web page comprising a "Login" block. The "Login" block may be configured to initiate the copy operation upon registration by the copying user 203. A screenshot of a web page for enabling the "Login" block to be configured is exemplarily illustrated in FIG. 22. In FIG. 22, the "Login" block is configured to automatically copy the web page "_Client" to a sub page of the web page "Clients". The copied web page is renamed using the first name and the last name of the copying user 203. The copying user 203 is directed to the copied web page immediately after registration. Permissions of a selected template user "_Client" are reassigned to the copying user 203 for the copied web page. If a "Show even when logged in" checkbox is checked, the "Login" block is shown to a copying user 203 with "Staff" permissions. The copying user 203 with "Staff" permissions may then register a third user and perform the copy operation for the third user to reassign the permissions of the selected template user to the third user.

The web page for enabling the "Login" block to be configured may comprise a "copy groups and subs" check box. Checking the "copy groups and subs" check box enables group memberships and subscriptions of the selected template user "_Client" are copied and reassigned to the copying user 203. The web page for enabling the "Login" block to be configured with the "copy groups and subs" check box checked is exemplarily illustrated in FIG. 23. The subscriptions may be associations with discussion boards or other blocks wherein the user is informed of changes made to the discussion board or the block. If a block to which the selected template user is subscribed is copied, the copying user 203 has a subscription to the copied block and not to the block in the first location.

Alternatively, the copy operation may be invoked by the copying user 203 upon registration but the web elements being copied may not assign any of the permissions to the copying user 203. For example, all customers registering at a business site may have a "customer history" page created. The customers may not have access or edit permissions to the created "customer history" page and may not be aware that the "customer history" page exists. Such web pages having no access or edit permissions may be used by the business to track and comment on the customer.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the database 201h, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method of permission assignment on copying a first web page at a first location to a second location in an online environment, comprising the steps of:
creating said first web page at said first location in said online environment by a creating user, wherein said online environment is implemented on a computer system comprising one or more processors, and wherein said online environment comprises:
a plurality of users registered with the online environment, wherein said registered users comprise:
said creating user that creates one or more of said first web page, said sub pages and said content blocks;
an instantiating user that copies one or more of said first web page, said sub pages and said content blocks; and
a template user, wherein said template user defines a model of a user having configurable options;
said first web page, wherein said first web page comprises a plurality of sub pages generated from a plurality of database structures and web content stored in a database, wherein said first web page and said sub pages comprise one or more content blocks, wherein said first web page and said sub pages display content from one or more of said content blocks, forming a hierarchy of said first web page, said sub pages and said content blocks, and wherein said online environment provides internet access to said first web page, said sub pages and said content blocks;
a plurality of user groups comprising said registered users as members of said user groups; and
said first web page, and each of the plurality of said sub pages contain a plurality of permission properties that associate said registered users and said user groups with a plurality of capabilities, wherein the capabilities comprise:
view the said first web page and said plurality of said sub pages;
add or remove content blocks to said first web page and/or said plurality of said sub pages; and
add or remove one or more of said sub pages of said first web pages;
wherein every registered user having membership in an associated said user group is also associated with the said capabilities to which the said user group is associated;
said content blocks comprising said permission properties that associate said registered users and said user groups with a plurality of capabilities, wherein said capabilities comprise:
view said content block;
modify said content block; and
execute a copy operation represented by the said content block;
wherein said online environment provides a plurality of online tools for creating and managing said first web page, said sub pages, said content blocks, said users, said user groups, and said permission properties;
creating a copy block web element within one or more of said first web page and said sub pages, and configuring said copy block web element to identify said first web page as a source web page to be copied, identify a parent page at said second location to insert said source web page as a sub page, provide a name for said sub page created by said copy operation, and selection of said template user as a designated user, and wherein said creating user further assigns execution permission property of the copy block web element to one or more of said users and said user groups;

assigning one or more of said permission properties for viewing said first web page, said sub pages and said content blocks to said designated template user by said creating user, wherein said creating user assigns said template user with memberships to one or more of said user groups, wherein said template user comprises said configurable options to receive said assigned permission properties;

instantiating execution of said copy operation as defined in said copy block web element by said instantiating user by virtue of one of:
  said instantiating user being one of the users assigned execution permission property on the copy block web element, and said instantiating user being a member of one of the user groups to which execution permission property on the copy block web element was assigned;

creating, at said second location, a second web page as a copy of the first web page, said sub pages of said first web page and said content blocks of said first web page, wherein each of said copied web page, said sub pages and said content blocks corresponding to said second web page, sub pages of said second web page and content blocks of said second web page, and retains the permission properties to the same users and the same user groups assigned for the copied first web page, said sub pages of the copied first web page, and content blocks of the copied first web page; and reassigning said permission properties associated with said template user for accessing said copied first web page, said sub pages of said first web page, and said content blocks of said first web page to said instantiating user.

2. The computer implemented method of claim 1, further comprising a step of modifying the second web page, created using the copied first web page, wherein said modification enables evolution of the first web page.

3. The computer implemented method of claim 1, further comprising a step of assigning said permission properties for allowing viewing of the first web page by one or more of a plurality of users by said creating user.

4. The computer implemented method of claim 1, wherein the instantiating user is given membership to said user groups to which the instantiating user was not already a member and to which the template user is a member.

5. The computer implemented method of claim 1, wherein said copy operation is initiated by one of said registered users, other than said instantiation user, by supplying identification of said instantiating user.

6. The computer implemented method of claim 1, wherein the copy operation is triggered automatically on registration of the initiating user with the online environment.

7. A computer system for permission assignment on copying a first web page at a first location to a second location in an online environment, said system comprising:
  a processor; and
  a memory stored computer executable instructions that when executed by the processor cause the processor to perform the steps of:
    creating said first web page at said first location in said online environment by a creating user, wherein said online environment is implemented on a computer system comprising one or more processors, and wherein said online environment comprises:
      a plurality of users registered with the online environment, wherein said registered users comprise:
        said creating user that creates one or more of said first web page, said sub pages and said content blocks;
        an instantiating user that copies one or more of said first web page, said sub pages and said content blocks; and
        a template user, wherein said template user defines a model of a user having configurable options;
      said first web page, wherein said first web page comprises a plurality of sub pages generated from a plurality of database structures and web content stored in a database, wherein said first web page and said sub pages comprise one or more content blocks, wherein said first web page and said sub pages display content from one or more of said content blocks, forming a hierarchy of said first web page, said sub pages and said content blocks, and wherein said online environment provides internet access to said first web page, said sub pages and said content blocks;
      a plurality of user groups comprising said registered users as members of said user groups;
      said first web page, and each of the plurality of said sub pages contain a plurality of permission properties that associate said registered users and said user groups with a plurality of capabilities, wherein the capabilities comprise:
        view the said first web page and said plurality of said sub pages;
        add or remove content blocks to said first web page and/or said plurality of said sub pages; and
        add or remove one or more of said sub pages of said first web pages;
      wherein every registered user having membership in an associated said user group is also associated with the said capabilities to which the said user group is associated;
      said content blocks comprising said permission properties that associate said registered users and said user groups with a plurality of capabilities, wherein said capabilities comprise:
        view said content block;
        modify said content block; and
        execute a copy operation represented by the said content block;
      wherein said online environment provides a plurality of online tools for creating and managing said first web page, said sub pages, said content blocks, said users, said user groups, and said permission properties;

creating a copy block web element within one or more of said first web page and said sub pages, and configuring said copy block web element to identify said first web page as a source web page to be copied, identify a parent page at said second location to insert said source web page as a sub page, provide a name for said sub page created by said copy operation, and selection of said template user as a designated user, and wherein said creating user further assigns execution permission property of the copy block web element to one or more of said users and said user groups;

assigning one or more of said permission properties for viewing said first web page, said sub pages and said content blocks to said designated template user by said creating user, wherein said creating user assigns said template user with memberships to one or more of said user groups, wherein said template user comprises said configurable options to receive said assigned permission properties;

instantiating execution of said copy operation as defined in said copy block web element by said instantiating user by virtue of one of:

said instantiating user being one of the users assigned execution permission property on the copy block web element, and said instantiating user being a member of one of the user groups to which execution permission property on the copy block web element was assigned;

creating, at said second location, a second web page as a copy of the first web page, said sub pages of said first web page and said content blocks of said first web page, wherein each of said copied web page, said sub pages and said content blocks corresponding to said second web page, sub pages of said second web page and content blocks of said second web page, and retains the permission properties to the same users and the same user groups assigned for the copied first web page, said sub pages of the copied first web page, and content blocks of the copied first web page; and reassigning said permission properties associated with said template user for accessing said copied first web page, said sub pages of said first web page, and said content blocks of said first web page to said instantiating user.

8. A non-transitory computer readable storage medium storing computer executable instructions that when executed by a processor cause the processor to perform the steps of:

creating said first web page at said first location in said online environment by a creating user, and wherein said online environment comprises:

a plurality of users registered with the online environment, wherein said registered users comprise:

said creating user that creates one or more of said first web page, said sub pages and said content blocks;

an instantiating user that copies one or more of said first web page, said sub pages and said content blocks; and a template user, wherein said template user defines a model of a user having configurable options;

said first web page, wherein said first web page comprises a plurality of sub pages generated from a plurality of database structures and web content stored in a database, wherein said first web page and said sub pages comprise one or more content blocks, wherein said first web page and said sub pages display content from one or more of said content blocks, forming a hierarchy of said first web page, said sub pages and said content blocks, and wherein said online environment provides internet access to said first web page, said sub pages and said content blocks;

a plurality of user groups comprising said registered users as members of said user groups and said first web page, and each of the plurality of said sub pages contain a plurality of permission properties that associate said registered users and said user groups with a plurality of capabilities, wherein the capabilities comprise:

view the said first web page and said plurality of said sub pages;

add or remove content blocks to said first web page and/or said plurality of said sub pages; and add or remove one or more of said sub pages of said first web pages;

wherein every registered user having membership in an associated said user group is also associated with the said capabilities to which the said user group is associated;

said content blocks comprising said permission properties that associate said registered users and said user groups with a plurality of capabilities, wherein said capabilities comprise:

view said content block;

modify said content block; and execute a copy operation represented by the said content block;

and wherein said online environment provides a plurality of online tools for creating and managing said first web page, said sub pages, said content blocks, said users, said user groups, and said permission properties;

creating a copy block web element within one or more of said first web page and said sub pages, and configuring said copy block web element to identify said first web page as a source web page to be copied, identify a parent page at said second location to insert said source web page as a sub page, provide a name for said sub page created by said copy operation, and selection of said template user as a designated user, and wherein said creating user further assigns execution permission property of the copy block web element to one or more of said users and said user groups;

assigning one or more of said permission properties for viewing said first web page, said sub pages and said content blocks to said designated template user by said creating user, wherein said creating user assigns said template user with memberships to one or more of said user groups, wherein said template user comprises said configurable options to receive said assigned permission properties;

instantiating execution of said copy operation as defined in said copy block web element by said instantiating user by virtue of one of:

said instantiating user being one of the users assigned execution permission property on the copy block web element, and said instantiating user being a member of one of the user groups to which execution permission property on the copy block web element was assigned;

creating, at said second location, a second web page as a copy of the first web page, said sub pages of said first web page and said content blocks of said first web page, wherein each of said copied web page, said sub pages and said content blocks corresponding to said second web page, sub pages of said second web page and content blocks of said second web page, and retains the permission properties to the same users and the same user groups assigned for the copied first web page, said sub pages of the copied first web page, and content blocks of the copied first web page; and reassigning said permission properties associated with said template user for accessing said copied first web page, said sub pages of said first web page, and said content blocks of said first web page to said instantiating user.

* * * * *